US012519637B2

(12) United States Patent
Salmela et al.

(10) Patent No.: US 12,519,637 B2
(45) Date of Patent: Jan. 6, 2026

(54) DATA USAGE RECORDS FOR ROAMING WIRELESS DEVICES

(71) Applicant: Telefonaktiebolaget LM Ericsson (publ), Stockholm (SE)

(72) Inventors: Patrik Salmela, Espoo (FI); Mukesh Thakur, Espoo (FI); Santeri Paavolainen, Masala (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 110 days.

(21) Appl. No.: 18/568,127

(22) PCT Filed: Jun. 9, 2021

(86) PCT No.: PCT/EP2021/065543
§ 371 (c)(1),
(2) Date: Dec. 7, 2023

(87) PCT Pub. No.: WO2022/258180
PCT Pub. Date: Dec. 15, 2022

(65) Prior Publication Data
US 2024/0275593 A1    Aug. 15, 2024

(51) Int. Cl.
*H04W 12/06* (2021.01)
*H04L 9/14* (2006.01)
*H04L 9/32* (2006.01)
*H04W 12/03* (2021.01)
*H04W 12/02* (2009.01)
*H04W 12/50* (2021.01)

(52) U.S. Cl.
CPC .............. *H04L 9/14* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 9,832,678 B1* | 11/2017 | Tandon | H04W 88/16 |
| 10,979,890 B2* | 4/2021 | Xu | H04W 8/02 |
| 2014/0050322 A1* | 2/2014 | Frank | H04W 12/062 |
| | | | 380/270 |

(Continued)

FOREIGN PATENT DOCUMENTS

GB    2 551 357 A    12/2017

OTHER PUBLICATIONS

Digital Signatures for Flows and Multicasts. Wong. IEEE. (Year: 1998).*

(Continued)

*Primary Examiner* — Venkat Perungavoor
(74) *Attorney, Agent, or Firm* — Rothwell, Figg, Ernst & Manbeck, P.C.

(57) ABSTRACT

There is provided a method performed by a first wireless device that is roaming in a visited network. The method comprises measuring (901) an amount of data transmitted and/or received by the first wireless device in a first session with the visited network; using (903) a private key to generate a signature for a data usage record that comprises the data measurement, wherein a public key corresponding to the private key is associated, by a home network of the first wireless device, with the first wireless device; and sending (905) the data usage record to the visited network.

18 Claims, 10 Drawing Sheets

(56) References Cited

U.S. PATENT DOCUMENTS

| | | | |
|---|---|---|---|
| 2014/0075567 A1 | 3/2014 | Raleigh et al. | |
| 2014/0301550 A1* | 10/2014 | Lewis | H04L 9/0822 380/259 |
| 2019/0239062 A1* | 8/2019 | Baek | H04W 8/12 |
| 2023/0300595 A1* | 9/2023 | Dudar | H04W 8/02 455/433 |

OTHER PUBLICATIONS

International Search Report and Written Opinion issued in International Application No. PCT/EP2021/065543 Feb. 6, 2022 (15 pages).
NEC: "Synchronization of KAUSF between AUSF and UE", 3GPP TSG-SA Meeting #95, S3-191206, Reno (US), 6-110 May 2019 (11 pages).
Nokia, "LI conformity by combining verification hash method with key binding of UE info into the key hierarchy—integrated in 5G AKA", 3GPP TSG SA WG3 (Security) Meeting #90Bis, S3-180963, Feb. 26-Mar. 2, 2018, San Diego (US), (7 pages).
ETSI TS 133 501 V16.3.0 (Aug. 2020), 5G; Security architecture and procedures for 5G System (3GPP TS 33.501 version 16.3.0 Release 16), Aug. 2020 (251 pages).
"Verifiable Credentials Data Model 1.0", Aug. 12, 2021 (98 pages).
"Decentralized Identifiers (DIDs) v1.0", Aug. 12, 2021 (111 pages).

\* cited by examiner

DATA USAGE RECORDS FOR ROAMING WIRELESS DEVICES

CROSS REFERENCE TO RELATED APPLICATIONS

This application is a 35 U.S.C. § 371 National Stage of International Patent Application No. PCT/EP2021/065543, filed 2021 Jun. 9.

TECHNICAL FIELD

This disclosure relates to wireless devices (e.g. user equipments—UEs) that are roaming in a visited network, and in particular to techniques for generating and verifying records of data usage by a wireless device while roaming.

BACKGROUND

When a $5^{th}$ Generation (5G) user equipment (UE)—i.e. a UE that is configured to operate according to the 5G standards—registers with a 5G network, it performs an authentication exchange resulting in mutual authentication, i.e. the UE and 5G network authenticate themselves to each other. This can be either Authentication and Key Agreement (AKA), in the form of 5G AKA or Improved Extensible Authentication Protocol (EAP) Method for $3^{rd}$ Generation AKA (EAP-AKA')—described in RFC5448, or some other EAP-based authentication method. For EAP, besides EAP-AKA', any other key generating EAP method can be used. Currently, EAP-Transport Layer Security (EAP-TLS)—described in RFC5216—has been defined as an exemplary EAP method for use in 5G, but that is limited to use in Standalone Non-Public networks (SNPN), i.e. private networks. Still, as the 5G networks support EAP, it is only the EAP client and EAP server that actually need to understand the EAP method used, so technically 5G networks can be considered to support any EAP method, and in the future it is likely that methods other than AKA methods can be used. The support for EAP-based authentication brings with it also the possibility to use different types of credentials compared to the traditional $3^{rd}$ Generation Partnership Project (3GPP) credentials. EAP-TLS, as an example, is run using certificate-based credentials.

5G registration when roaming involves both the Home Public Land Mobile Network (HPLMN) and the Visited Public Land Mobile Network (VPLMN). The UE connects to the VPLMN and provides its identifier, which identifies the HPLMN. The VPLMN then forwards the registration request to the HPLMN and the 5G registration and authentication is performed between the UE and HPLMN, but also involving the VPLMN Security Anchor Function (SEAF). At the end of the authentication the HPLMN provides session keys to the VPLMN (SEAF), which derives further keys from it and distributes the keys to various network functions (NFs) in the VPLMN. The NF in the HPLMN that takes care of the authentication is the Authentication Server Function (AUSF), and the same NF also takes care of authentication in non-roaming scenarios. The AUSF gets the authentication vector from a Unified Data Management (UDM) NF.

When a UE is roaming and connected via a visited network, the data traffic typically exits the 5G system (5GS) via the User Plane Function (UPF) of the home operator (this is known as a 'home-routed' scenario). Alternatively, so-called local breakout (LBO) can be used. In LBO, the data traffic exits the mobile networks and enters, for example, the Internet via the UPF in the visited network. This has the benefit that routing is optimised as the data traffic does not have to travel back to the home operator, which might result in triangular routing. For example, consider a home operator that is in Finland, and the UE is roaming in New Zealand. In this case, in a home-routed scenario, all traffic would go from the UE in New Zealand to the UPF in the home operator in Finland, and from there to the Internet. If the UE is accessing a service in New Zealand the data traffic would likely make an unnecessary trip around the world to reach a web server which might be located in the same building as the UE. This home-routed approach can lead to both unnecessary resource consumption, as well as poorly optimised network performance with regards to latency, etc.

The 5G Core (5GC) can assign Data Network Names (DNNs) to the external networks that can be connected to via the 5GC. Public DNNs are used, for example for internet access, and the DNN is typically "internet". A DNN can be seen as an identifier of the network the external facing interface of the UPF connects to for the specific Protocol Data Units (PDU) session. A UPF can serve multiple DNNs. The DNN is bound to the PDU session established for the UE/subscription. A UE/subscription can establish a PDU session only to those DNNs that are configured for the subscription, i.e. the 5GC performs access control based on the subscription information and only allows subscriptions configured with a specific DNN to create a PDU session for the DNN. Of course, some DNNs might be public and usable by all.

To tighten the access control for the DNN, Secondary Authentication (SA) can be used before allowing the UE to access the DNN. When enabled for a DNN, the 5GC will not allow the establishment of a PDU session with the specific DNN unless SA has also been successfully performed. SA can be an EAP method exchange between the UE and an Authentication, Authorisation, and Accounting (AAA) server, which could be located in the 5GC. For SA, typically credentials other than 3GPP credentials are used, e.g. public key certificates. The EAP exchange can be performed with a Session Management Function (SMF) in the 5GC acting as the EAP authenticator and the AAA server acting as the EAP server.

A Decentralised Identifier (DID) is a globally unique cryptographically-verifiable identifier used to identify any subject, such as a person, organisation, device, object, etc. DIDs are defined in "Decentralized Identifiers (DIDs) v 1.0 Core architecture, data model, and representations", W3C Candidate Recommendation Draft 22 May 2021. DIDs do not require a centralised registration authority because control of the identifier can be provided using cryptography. The DID is generated, registered and verified cryptographically. A DID can be expressed in the form of Uniform Resource Identifier (URI). An Example of a DID is "did:example: 123456789abcdefghi", where "did" is the DID(URI) scheme, "example" is the DID method specification, and "123456789abcdefghi" is the DID method specific identifier.

According to "Decentralized Identifiers (DIDs) v 1.0 Core architecture, data model, and representations", a DID scheme is the formal syntax of DID. A generic DID scheme begins with the prefix did:. The DID scheme is associated with a DID method specification. The DID method specification defines a specific DID method scheme that works with that specific DID method. An example of the DID method specifications are how to create, read, update, and/or revoke a DID method specific identifier on a specific network, e.g. a usually distributed (blockchain) network. The DID method specific identifier is the unique key across the network. These keys are usually a hash of a public key.

A DID, regardless of particular methods used, can be resolved to a standard resource describing the subject of the DID. This resource is called a DID Document. The DID Document is represented as a JavaScript Object Notation for Linked Data (JSON-LD) document describing the entity/resource where DID is a key and the DID Document is its value.

Verifiable Credentials (VCs) are a standard way of defining credentials in web which are cryptographically secure, privacy respecting and machine-verifiable. VCs are described in "Verifiable Credentials Data Model 1.0 Expressing verifiable information on the Web", W3C Candidate Recommendation 26 Mar. 2019. FIG. 1 shows a simplified structure of a VC 101. The VC 101 comprises Credential Metadata 102, one or more claims 103 and one or more Proofs 104. The claims 103 are statements about the 'holder' of the VC 101. The claims 103 are 'tamper-evident', i.e. it is possible to determine if the claims 103 have been altered, and the Credential Metadata 102 cryptographically proves who issued the VC 101. The Credential Metadata 102 comprises an identifier and can include a set of properties such as the identity of the issuer of the VC 101, expiry data and time, a public key for verification purposes, or a revocation mechanism.

FIG. 2 shows two examples of Claims. The claim 201 on the left hand side shows a simple claim about the person ('Joe Doe') being student of a university ('University A'). The University A is the Issuer 202 of this claim 201. In a VC, the Claim(s) can contain several assertions, as shown in the exemplary claim 211 on the right hand side of FIG. 2. Here, the claim 211 indicates that the person ('Joe Doe') is majoring in 'CS', is in their $1^{st}$ year of study, is a student of University A and enrolled in the 2020 academic year. The Issuer 212 of claim 211 is University A.

FIG. 3 outlines the use of VCs. The system has an Issuer 301, a Holder 302, a Verifier 303 and a Verifiable Data Registry 304. Each Issuer 301, Holder 302 and Verifier 303 cryptographically create a DID and associate a set of public keys to their identifier. The public keys of the Issuer 301 are made publicly available, so that the Verifier 303 can validate that a VC presented to the Verifier 303 by the Holder 302 has been produced by the Issuer 301.

An Issuer 301 is an organisation or entity that creates digitally signed VCs for Holders 302. The Holder 302 stores the VC. The Holder 302 could be a user or a device. A Verifier 303 is an organisation or entity that verifies the VC held by the Holder 302. For example, referring to the claim 201 in FIG. 2, University A 202 (the Issuer 301) issues university certificates (VC) to its students (the Holders 302). A company (the Verifier 303) where the student applies for a job, verifies the VC has been issued by the university (Issuer 301).

The Issuer 301, Holder 302, and Verifier 303 are linked to the Verifiable Data Registry 304 which maintains DIDs/identifiers and schemas. The schemas are data schemas which can be used to verify the structure and contents of a VC. It can also be used to map the contents of a VC and enforce a specific structure on a given collection of data. The Verifiable Data Registry 304 could be a trusted database, a decentralised database, a government identity (ID) database, a blockchain, or some other secure and accessible service.

When a Verifier 303 gets a VC from a Holder 302, it can verify the structure of the VC based on schemas stored in the Verifiable Data Registry 304. It can also verify the integrity of the VC based on the signature created by the Issuer 301. It can further verify the identity of the Issuer 301 from the Registry 304. Finally, the Verifier 303 can authenticate the Holder 302 based on the identity (e.g. DID) stored in the VC.

A VC verification scheme can also often be extended with zero-knowledge proofs, where the Verifier 303 requests the Holder 302 prove that they are in possession of a claim asserting some property. For example, the Verifier 303 could request the Holder 302 to prove they are a student in a given university. Such zero-knowledge proof is constructed so that the Holder 302 does not have to reveal the VC itself to the Verifier 303. In the case of the university example, this would allow the student to demonstrate their student status at the university without revealing their name (or some other identifier that is traceable to the individual) to the Verifier 303.

A VC is much like a public key certificate; in that it contains a provable identifier (e.g. a public key), some information about the Holder 302, and is signed by the Issuer 301 (e.g. a Certificate Authority (CA)). The difference is that VCs are more dynamic with regard to what can be stored in it, and the possibility of having zero-knowledge proofs.

Asymmetric credentials are public/private key pairs. The cryptographic operation performed with one key can be reversed/verified with the other key. For example something encrypted with a public key can be decrypted using the corresponding private key. The public key acts as the identity/identifier of the key pair, or the Holder 302 of the key pair. The public key, and the identity and other attributes of the Holder 302, can be certified by a Certificate Authority (CA) which verifies the identity of the Holder 302 of the certificate/key pair. The CA can sign the certificate and the information in it as proof of verification. However, the certificate can be quite big, and there can be certificate chains meaning that communicating all information to be able to verify a certificate could grow even further. One approach to reduce this overhead is to use raw public keys (RPK). With RPK the certificate is reduced to a minimal size, and it is not certified by a CA. Instead, the RPK "certificate" is a type of stub so that the public key can be handled in a similar way as a CA-issued certificate public key.

SUMMARY

Local breakout (LBO), while optimising the routing of network traffic in a roaming scenario, is not widely used due to problems with how to reliably gather usage statistics and the associated billing/charging information. In $4^{th}$ Generation (4G) systems, the home network does not even know if a subscriber has actually attached to a visited network, meaning that a visited network/operator could (assuming LBO was used) generate a false report of data used during LBO for any subscriber of the home operator, and try to charge the home operator for this data usage. Part of this problem has been fixed in 5G systems, as the home operator takes part in the 5G registration procedure and verifies that the subscriber has indeed registered via the visited network. However, the home operator still does not know the actual data usage of the roaming subscriber if LBO is used, and thus the visited operator/network could still provide false data usage statistics for those subscribers that are registered to it. These issues require network operators to manage their risks via extensive contractual agreements, which increase overhead and reduce flexibility.

In addition to these problems with the use of LBO, similar issues with verifying data usage arise for any type of service used while a subscriber/UE is roaming in another network.

Therefore there is a need for improvements in the reporting of data usage for a wireless device that is roaming.

According to a first aspect, there is provided a method performed by a first wireless device that is roaming in a visited network. The method comprises measuring an amount of data transmitted and/or received by the first wireless device in a first session with the visited network; using a private key to generate a signature for a data usage record that comprises the data measurement, wherein a public key corresponding to the private key is associated, by a home network of the first wireless device, with the first wireless device; and sending the data usage record to the visited network.

According to a second aspect, there is provided a method performed by one or more network nodes in a visited network. The method comprises measuring an amount of data transmitted and/or received by a first wireless device in a first session with the visited network, wherein the first wireless device is roaming in the visited network; receiving a data usage record from the first wireless device, wherein the data usage record comprises a signature for the data usage record and a data measurement by the first wireless device of the amount of data transmitted and/or received by the first wireless device in the first session; determining whether the data usage record is to be trusted based on the signature and a comparison of the data measurement to the measurement of the amount of data by the one or more network nodes, wherein the determining comprises using a public key associated with a private key that is to be used by the first wireless device to generate signatures for data usage records; and sending the data usage record to a home network of the first wireless device if the data usage record is determined to be trusted.

According to a third aspect, there is provided a method performed by one or more network nodes in a home network. The method comprising receiving a data usage record relating to a first wireless device from a visited network, wherein the first wireless device is a subscriber of the home network and is roaming in the visited network, wherein the data usage record comprises a signature for the data usage record and a data measurement by the first wireless device of the amount of data transmitted and/or received by the first wireless device in a first session with the visited network; determining whether the data usage record is to be trusted based on the signature, wherein the determining comprises using a public key associated with a private key that is to be used by the first wireless device to generate signatures for data usage records; and processing the data usage record if the data usage record is determined to be trusted.

According to a fourth aspect, there is provided a computer program product comprising a computer readable medium having computer readable code embodied therein, the computer readable code being configured such that, on execution by a suitable computer or processor, the computer or processor is caused to perform the method according to the first aspect, the second aspect, the third aspect, or any embodiments thereof.

According to a fifth aspect, there is provided a first wireless device configured to roam in a visited network. The first wireless device is configured to measure an amount of data transmitted and/or received by the first wireless device in a first session with the visited network; use a private key to generate a signature for a data usage record that comprises the data measurement, wherein a public key corresponding to the private key is associated, by a home network of the first wireless device, with the first wireless device; and send the data usage record to the visited network.

According to a sixth aspect, there is provided one or more network nodes configured for use in a visited network. The one or more network nodes are configured to: measure an amount of data transmitted and/or received by a first wireless device in a first session with the visited network, wherein the first wireless device is roaming in the visited network; receive a data usage record from the first wireless device, wherein the data usage record comprises a signature for the data usage record and a data measurement by the first wireless device of the amount of data transmitted and/or received by the first wireless device in the first session; determine whether the data usage record is to be trusted based on the signature and a comparison of the data measurement to the measurement of the amount of data by the one or more network nodes, wherein the determining comprises using a public key associated with a private key that is to be used by the first wireless device to generate signatures for data usage records; and send the data usage record to a home network of the first wireless device if the data usage record is determined to be trusted.

According to a seventh aspect, there is provided one or more network nodes configured for use in a home network. The one or more network nodes are configured to: receive a data usage record relating to a first wireless device from a visited network, wherein the first wireless device is a subscriber of the home network and is roaming in the visited network, wherein the data usage record comprises a signature for the data usage record and a data measurement by the first wireless device of the amount of data transmitted and/or received by the first wireless device in a first session with the visited network; determine whether the data usage record is to be trusted based on the signature, wherein the determining comprises using a public key associated with a private key that is to be used by the first wireless device to generate signatures for data usage records; and process the data usage record if the data usage record is determined to be trusted.

According to an eighth aspect, there is provided a first wireless device operative to roam in a visited network. The first wireless device comprises a processor and a memory, said memory containing instructions executable by said processor whereby said first wireless device is operative to: measure an amount of data transmitted and/or received by the first wireless device in a first session with the visited network; use a private key to generate a signature for a data usage record that comprises the data measurement, wherein a public key corresponding to the private key is associated, by a home network of the first wireless device, with the first wireless device; and send the data usage record to the visited network.

According to a ninth aspect, there is provided one or more network nodes for use in a visited network. The one or more network nodes comprise a processor and a memory, said memory containing instructions executable by said processor whereby said one or more network nodes are operative to: measure an amount of data transmitted and/or received by a first wireless device in a first session with the visited network, wherein the first wireless device is roaming in the visited network; receive a data usage record from the first wireless device, wherein the data usage record comprises a signature for the data usage record and a data measurement by the first wireless device of the amount of data transmitted and/or received by the first wireless device in the first session; determine whether the data usage record is to be trusted based on the signature and a comparison of the data measurement to the measurement of the amount of data by the one or more network nodes, wherein the determining comprises using a public key associated with a private key that is to be used by the first wireless device to generate signatures for data usage records; and send the data usage record to a home network of the first wireless device if the data usage record is determined to be trusted.

According to a tenth aspect, there is provided one or more network nodes for use in a home network. The one or more network nodes comprise a processor and a memory, said memory containing instructions executable by said processor whereby said one or more network nodes are operative to: receive a data usage record relating to a first wireless device from a visited network, wherein the first wireless device is a subscriber of the home network and is roaming in the visited network, wherein the data usage record comprises a signature for the data usage record and a data measurement by the first wireless device of the amount of data transmitted and/or received by the first wireless device in a first session with the visited network; determine whether the data usage record is to be trusted based on the signature, wherein the determining comprises using a public key associated with a private key that is to be used by the first wireless device to generate signatures for data usage records; and process the data usage record if the data usage record is determined to be trusted.

The above aspects and embodiments thereof can provide one or more of the following advantages. The techniques enable local breakout (LBO) to be used in a trustworthy way as the data usage by the wireless device in LBO mode is recorded and cannot be spoofed by the visited network. Roaming wireless devices/subscribers can receive a lower service latency and a higher bandwidth as LBO can be provided more broadly due to the reduced financial risk to home networks. A visited network can learn policies with respect to the services to be used by the roaming subscriber, and adhere to those policies, and also use the learnt policies as proof of agreement of the policy terms. The visited network can learn the policies from the wireless device through a verifiable credential (VC)-based registration procedure. Alternatively, the visited network can learn the policies from the home network using a conventional registration procedure. Alternatively, if a conventional registration procedure is used, the visited network can learn the policies via a secondary authentication procedure that uses VC. In some embodiments, roaming policies can include provisions for situations where the home network is not reachable, allowing roaming, and optionally LBO, to occur even when home network is not reachable.

BRIEF DESCRIPTION OF THE DRAWINGS

Some of the embodiments contemplated herein will now be described more fully with reference to the accompanying drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Briefly, the techniques disclosed herein provide for the use of Verifiable Credentials, Certificates, or some other form of credential to establish trust, and optionally also policies, in a mobile network roaming scenario. The visited network (also referred to interchangeably herein as a VPLMN) can optionally use VC/Certificates for the registration of the UE, in which case the VPLMN may not involve the home network (also referred to interchangeably herein as a HPLMN) in the registration of the UE with the VPLMN. Alternatively, registration of the UE with the VPLMN can involve the HPLMN according to conventional techniques, with the VC/Certificates provided to the VPLMN as part of a secondary authentication procedure. With trust established, the UE can use services involving data traffic in the visited network, such as local breakout where data traffic is not routed via the home network, and data usage can be recorded and reported to the home network in a verifiable way. Optionally the data usage can be securely linked to a roaming policy agreed or provided during UE registration. Thus, by using asymmetric keys and optionally certified usage policies for a subscriber/UE, a visited network can provide services to a roaming UE without involving the home network, while still being able to undeniably prove actual service use and adherence to said policies.

Figure 1:
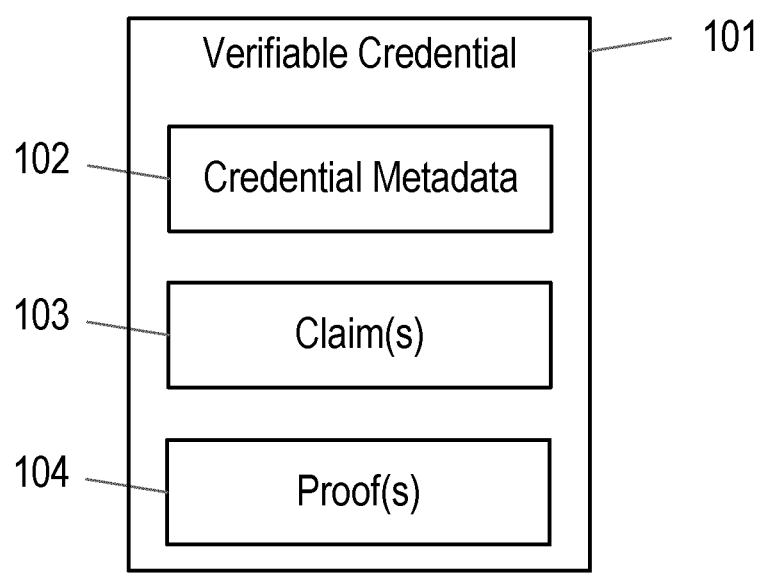
FIG. 1 shows a simplified structure of a verifiable credential, VC.
Figure 2:
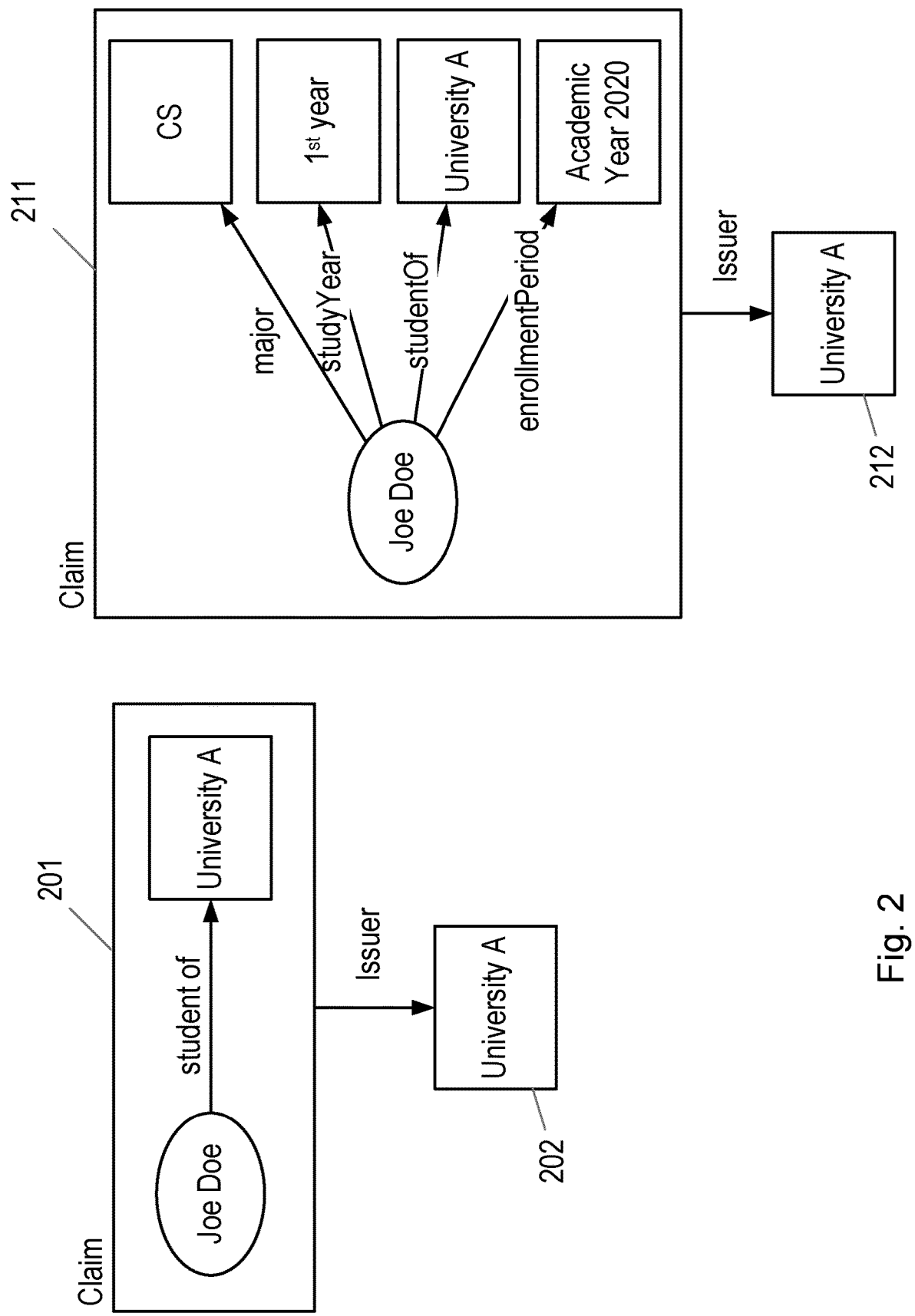
FIG. 2 shows two examples of Claims that can be included in a VC
Figure 3:
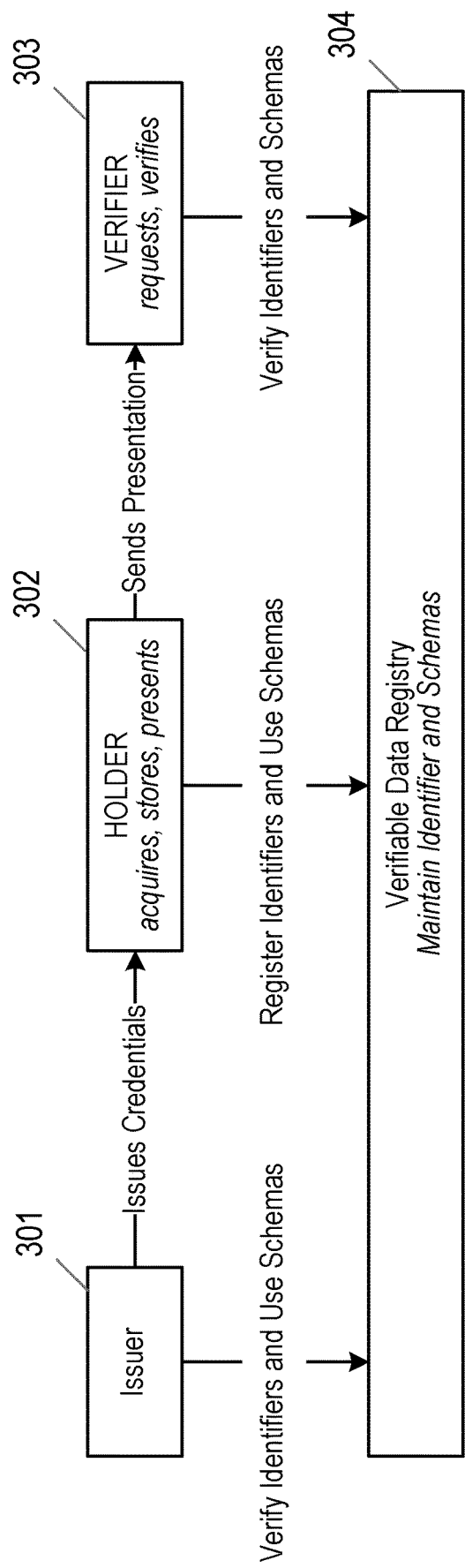
FIG. 3 outlines the use of VCs.
Figure 4:
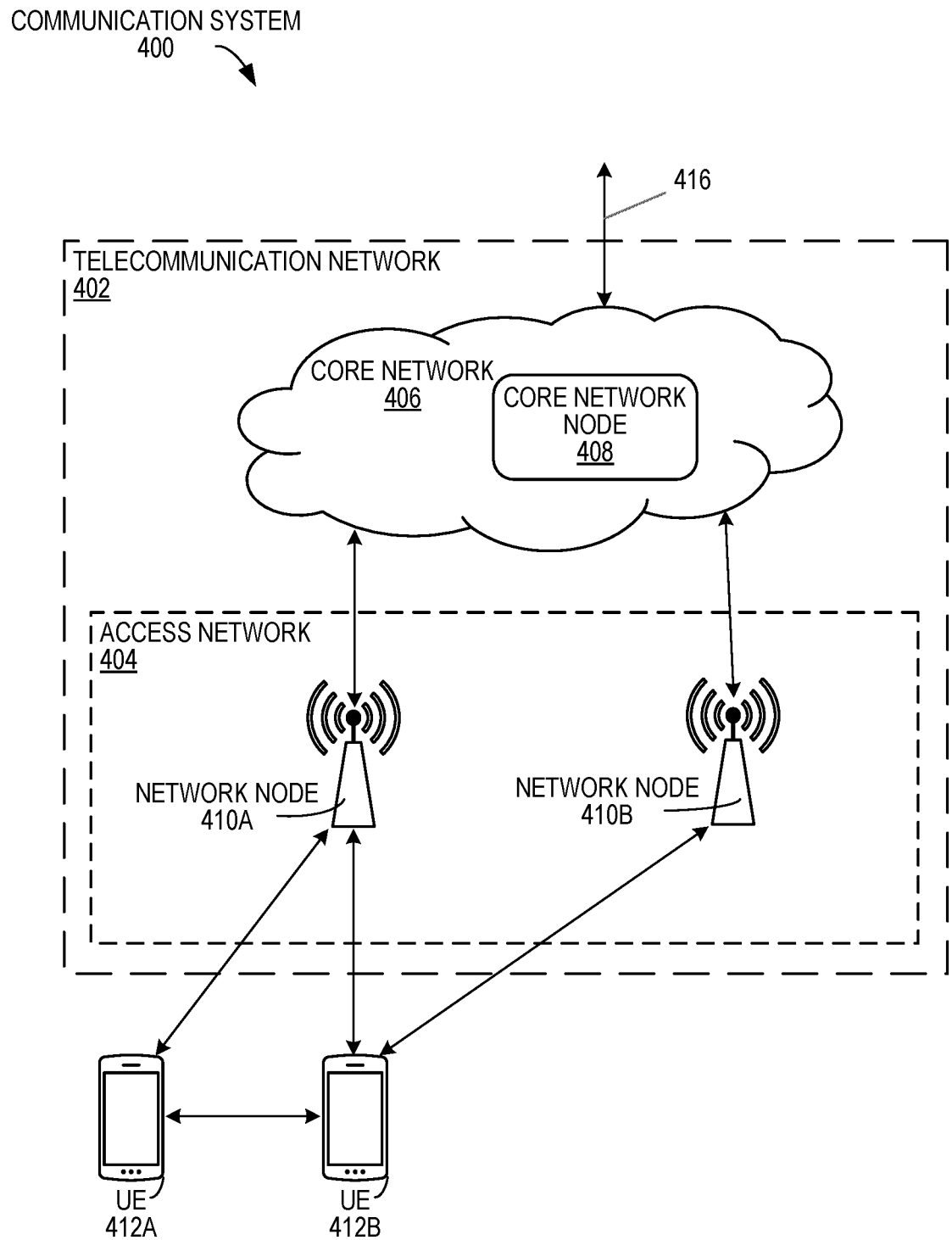
FIG. 4 is an example of a communication system from which log data can be obtained.

FIG. 4 shows an example of a communication system 400 which can implement any of the techniques described herein. The communication system 400 includes telecommunication network 402, i.e. a communication network, that includes an access network 404, such as a radio access network (RAN), and a core network 406, which includes one or more core network nodes 408. The access network 404 includes one or more access network nodes, such as network nodes 410a and 410b (one or more of which may be generally referred to as network nodes 410), or any other similar 3GPP access node or non-3GPP access point. The network nodes 410 facilitate direct or indirect connection of wireless devices (also referred to as user equipment (UEs)), such as by connecting UEs 412a and 412b (one or more of which may be generally referred to as wireless devices 412 or UEs 412) to the core network 406 over one or more wireless connections.

UE 412a (or an owner of UE 412a) may be a subscriber of the telecommunication network 402, in which case telecommunication network 402 is the home network (e.g. the HPLMN) for UE 412a. Alternatively, UE 412a (or an owner of UE 412a) may be a subscriber of a different network to the telecommunication network 402, in which case telecommunication network 402 is a visited network (e.g. a VPLMN) for UE 412a. Thus, the telecommunication network 402 can be a home network for one or more UEs 412, and can act as a visited network for one or more UEs 412.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 400 may include any number of wired or wireless networks, network nodes, UEs, and/or any other components or systems that may facilitate or participate in the communication of data and/or signals whether via wired or wireless connections. The communication system 400 may include and/or interface with any type of communication, telecommunication, data, cellular, radio network, and/or other similar type of system.

The UEs 412 may be any of a wide variety of communication devices, including wireless devices arranged, configured, and/or operable to communicate wirelessly with the network nodes 410 and other communication devices. Similarly, the network nodes 410 are arranged, capable, configured, and/or operable to communicate directly or indirectly with the UEs 412 and/or with other network nodes or equipment in the telecommunication network 402 to enable and/or provide network access, such as wireless network access, and/or to perform other functions, such as administration in the telecommunication network 402.

The core network 406 includes one more core network nodes (e.g., core network node 408) that are structured with hardware and software components. Features of these components may be substantially similar to those described with respect to the UEs, network nodes, and/or hosts, such that the descriptions thereof are generally applicable to the corresponding components of the core network node 408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

As a whole, the communication system 400 of FIG. 4 enables connectivity between the UEs, network nodes, and external networks, servers or devices in other telecommunication networks; the latter of which is indicated by arrow 416. The external networks or servers can be the internet, and the other telecommunication networks can be, for example, roaming partners of the telecommunication network 402.

The communication system may be configured to operate according to predefined rules or procedures, such as specific standards that include, but are not limited to: Global System for Mobile Communications (GSM); Universal Mobile Telecommunications System (UMTS); LTE, and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

Figure 5:
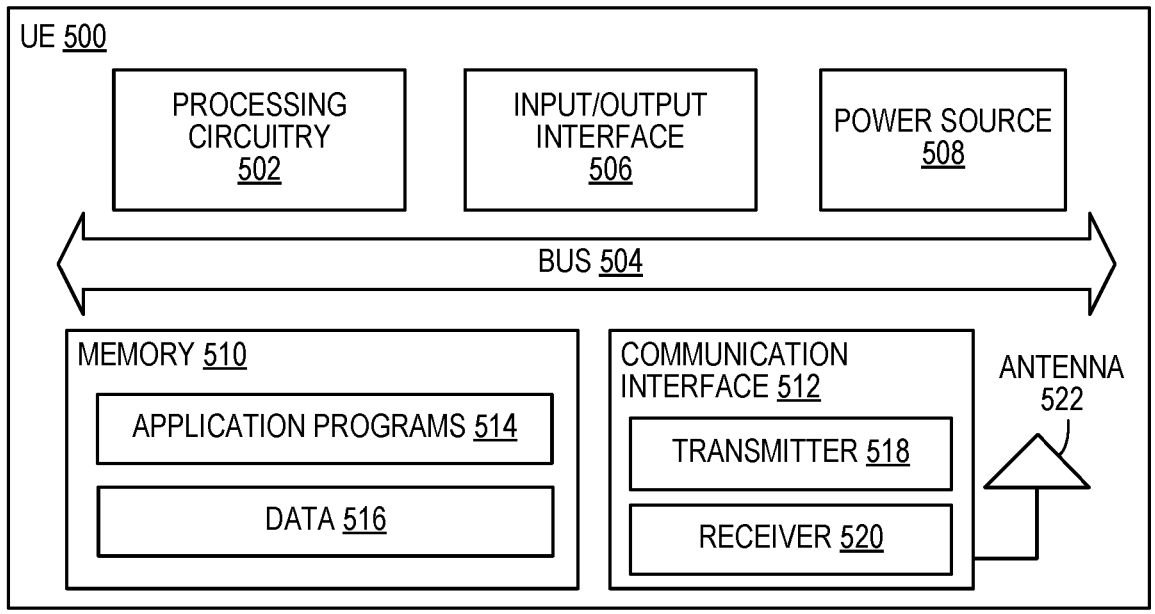
FIG. 5 shows a UE in accordance with some embodiments.

FIG. 5 shows a UE 500 in accordance with some embodiments. A UE is also interchangeably referred to as a "wireless device" herein. A UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless camera, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the $3^{rd}$ Generation Partnership Project (3GPP), including a narrow band internet of things (NB-IoT) UE, a machine type communication (MTC) UE, and/or an enhanced MTC (eMTC) UE.

The UE 500 includes processing circuitry 502 that is operatively coupled via a bus 504 to an input/output interface 506, a power source 508, a memory 510, a communication interface 512, and/or any other component, or any combination thereof. Certain UEs may utilize all or a subset of the components shown in FIG. 5. The level of integration between the components may vary from one UE to another UE. Further, certain UEs may contain multiple instances of a component, such as multiple processors, memories, transceivers, transmitters, receivers, etc.

The processing circuitry 502 is configured to process instructions and data and may be configured to implement any sequential state machine operative to execute instructions stored as machine-readable computer programs in the memory 510. The processing circuitry 502 may be implemented as one or more hardware-implemented state machines (e.g., in discrete logic, field-programmable gate arrays (FPGAS), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 502 may include multiple central processing units (CPUs). The processing circuitry 502 may be operable to provide, either alone or in conjunction with other UE 500 components, such as the memory 510, to provide UE 500 functionality. For example, the processing circuitry 502 may be configured to cause the UE 502 to perform the methods as described with reference to FIG. 9.

In the example, the input/output interface 506 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 500. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 508 is structured as a battery or battery pack. Other types of power sources, such as an external power source (e.g., an electricity outlet), photovoltaic device, or power cell, may be used. The power source 508 may further include power circuitry for delivering power from the power source 508 itself, and/or an external power source, to the various parts of the UE 500 via input circuitry or an interface such as an electrical power cable. Delivering power may be, for example, for charging of the power source 508. Power circuitry may perform any formatting, converting, or other modification to the power from the power source 508 to make the power suitable for the respective components of the UE 500 to which power is supplied.

The memory 510 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 510 includes one or more application programs 514, such as an operating system, web browser application, a widget, gadget engine, or other application, and corresponding data 516. The memory 510 may store, for use by the UE 500, any of a variety of various operating systems or combinations of operating systems.

The memory 510 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card'. The memory 510 may allow the UE 500 to access instructions, application programs and the like, stored on transitory or non-transitory memory media, to off-load data, or to upload data. An article of manufacture, such as one utilizing a communication system may be tangibly embodied as or in the memory 510, which may be or comprise a device-readable storage medium.

The processing circuitry 502 may be configured to communicate with an access network or other network using the communication interface 512. The communication interface 512 may comprise one or more communication subsystems and may include or be communicatively coupled to an antenna 522. The communication interface 512 may include one or more transceivers used to communicate, such as by communicating with one or more remote transceivers of another device capable of wireless communication (e.g., another UE or a network node in an access network). Each transceiver may include a transmitter 518 and/or a receiver 520 appropriate to provide network communications (e.g., optical, electrical, frequency allocations, and so forth). Moreover, the transmitter 518 and receiver 520 may be coupled to one or more antennas (e.g., antenna 522) and may share circuit components, software or firmware, or alternatively be implemented separately.

In some embodiments, communication functions of the communication interface 512 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

A UE, when in the form of an Internet of Things (IoT) device, may be a device for use in one or more application domains, these domains comprising, but not limited to, city wearable technology, extended industrial application and healthcare. Non-limiting examples of such an IoT device are devices which are or which are embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence on the intended application of the IoT device in addition to other components as described in relation to the UE 500 shown in FIG. 5.

Figure 6:
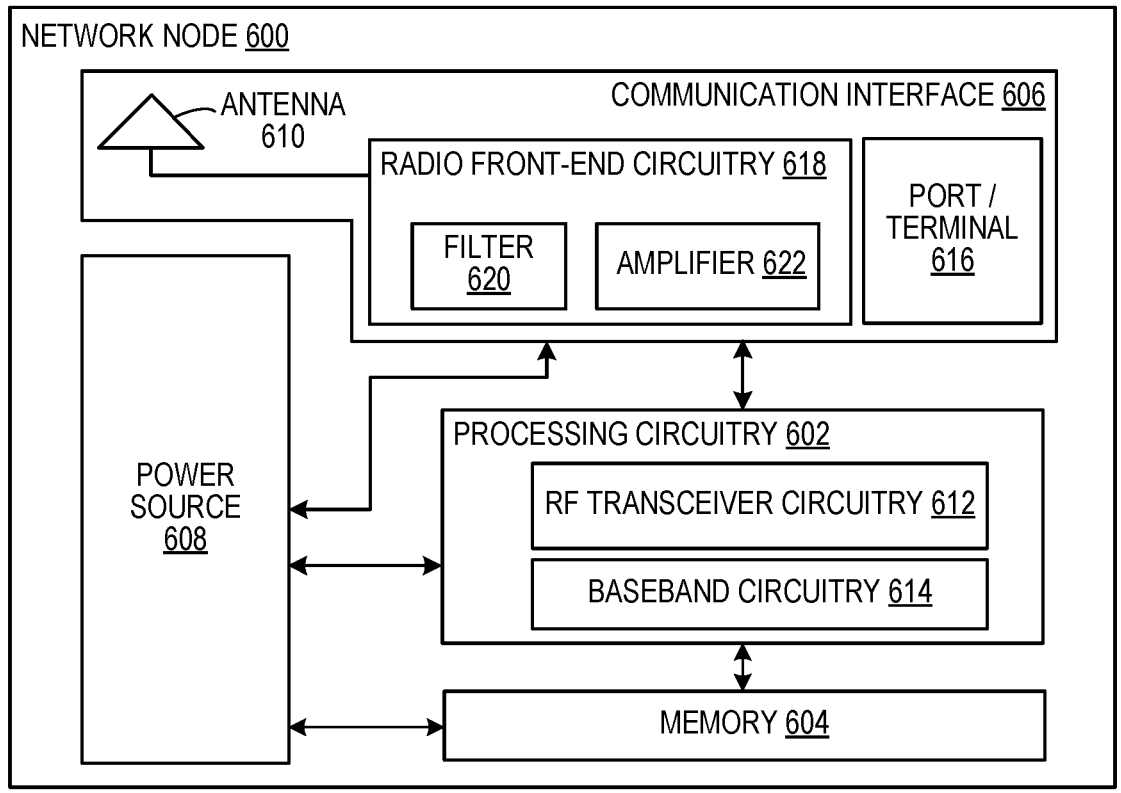
FIG. 6 shows a network node in accordance with some embodiments.

FIG. 6 shows a network node 600 in accordance with some embodiments. As used herein, network node refers to equipment capable, configured, arranged and/or operable to communicate directly or indirectly with a UE and/or with other network nodes or equipment, in a telecommunication network. The network node 600 may be a network node in the access network 404, or a network node in the core network 406. Examples of network nodes 600 in the access network 404 include, but are not limited to, access points (APs) (e.g., radio access points), base stations (BSs) (e.g., radio base stations, Node Bs, evolved Node Bs (eNBs) and NR NodeBs (gNBs)). Examples of network nodes 600 in the core network 406 include, but are not limited to, a MSC, MME, HSS, AMF, SMF, AUSF, SIDF, UDM, SEPP, NEF, and/or a UPF.

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 600 includes processing circuitry 602, a memory 604, a communication interface 606, and a power source 608, and/or any other component, or any combination thereof. The network node 600 may be composed of multiple physically separate components (e.g., a NodeB component and a RNC component, or a BTS component and a BSC component, etc.), which may each have their own respective components. In certain scenarios in which the network node 600 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 600 may be configured to support multiple radio access technologies (RATs). In such embodiments, some components may be duplicated (e.g., separate memory 604 for different RATs) and some components may be reused (e.g., a same antenna 610 may be shared by different RATs). The network node 600 may also include multiple sets of the various illustrated components for different wireless technologies integrated into network node 600, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 600.

The processing circuitry 602 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 600 components, such as the memory 604, to provide network node 600 functionality. For example, the processing circuitry 602 may be configured to cause the network node to perform the methods as described with reference to either or both of FIGS. 10 and 11.

In some embodiments, the processing circuitry 602 includes a system on a chip (SOC). In some embodiments, the processing circuitry 602 includes one or more of radio frequency (RF) transceiver circuitry 612 and baseband processing circuitry 614. In some embodiments, the radio frequency (RF) transceiver circuitry 612 and the baseband processing circuitry 614 may be on separate chips (or sets of chips), boards, or units, such as radio units and digital units. In alternative embodiments, part or all of RF transceiver circuitry 612 and baseband processing circuitry 614 may be on the same chip or set of chips, boards, or units.

The memory 604 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 602. The memory 604 may store any suitable instructions, data, or information, including a computer program, software, an application including one or more of logic, rules, code, tables, and/or other instructions capable of being executed by the processing circuitry 602 and utilized by the network node 600. The memory 604 may be used to store any calculations made by the processing circuitry 602 and/or any data received via the communication interface 606. In some embodiments, the processing circuitry 602 and memory 604 is integrated.

The communication interface 606 is used in wired or wireless communication of signalling and/or data between a network node, access network, and/or UE. As illustrated, the communication interface 606 comprises port(s)/terminal(s) 616 to send and receive data, for example to and from a network over a wired connection. In embodiments where the network node 600 is a network node in the access network 404, the communication interface 606 can also include radio front-end circuitry 618 that may be coupled to, or in certain embodiments a part of, the antenna 610. Radio front-end circuitry 618 comprises filters 620 and amplifiers 622. The radio front-end circuitry 618 may be connected to an antenna 610 and processing circuitry 602. The radio front-end circuitry may be configured to condition signals communicated between antenna 610 and processing circuitry 602. The radio front-end circuitry 618 may receive digital data that is to be sent out to other network nodes or UEs via a wireless connection. The radio front-end circuitry 618 may convert the digital data into a radio signal having the appropriate channel and bandwidth parameters using a combination of filters 620 and/or amplifiers 622. The radio signal may then be transmitted via the antenna 610. Similarly, when receiving data, the antenna 610 may collect radio signals which are then converted into digital data by the radio front-end circuitry 618. The digital data may be passed to the processing circuitry 602. In other embodiments, the communication interface may comprise different components and/or different combinations of components.

In certain alternative embodiments, the network node 600 does not include separate radio front-end circuitry 618, instead, the processing circuitry 602 includes radio front-end circuitry and is connected to the antenna 610. Similarly, in some embodiments, all or some of the RF transceiver circuitry 612 is part of the communication interface 606. In still other embodiments, the communication interface 606 includes one or more ports or terminals 616, the radio front-end circuitry 618, and the RF transceiver circuitry 612, as part of a radio unit (not shown), and the communication interface 606 communicates with the baseband processing circuitry 614, which is part of a digital unit (not shown).

The antenna 610 may include one or more antennas, or antenna arrays, configured to send and/or receive wireless signals. The antenna 610 may be coupled to the radio front-end circuitry 618 and may be any type of antenna capable of transmitting and receiving data and/or signals wirelessly. In certain embodiments, the antenna 610 is separate from the network node 600 and connectable to the network node 600 through an interface or port.

The antenna 610, communication interface 606, and/or the processing circuitry 602 may be configured to perform any receiving operations and/or certain obtaining operations described herein as being performed by the network node. Any information, data and/or signals may be received from a UE, another network node and/or any other network equipment. Similarly, the antenna 610, the communication interface 606, and/or the processing circuitry 602 may be configured to perform any transmitting operations described herein as being performed by the network node. Any information, data and/or signals may be transmitted to a UE, another network node and/or any other network equipment.

The power source 608 provides power to the various components of network node 600 in a form suitable for the respective components (e.g., at a voltage and current level needed for each respective component). The power source 608 may further comprise, or be coupled to, power management circuitry to supply the components of the network node 600 with power for performing the functionality described herein. For example, the network node 600 may be connectable to an external power source (e.g., the power grid, an electricity outlet) via an input circuitry or interface such as an electrical cable, whereby the external power source supplies power to power circuitry of the power source 608. As a further example, the power source 608 may comprise a source of power in the form of a battery or battery pack which is connected to, or integrated in, power circuitry. The battery may provide backup power should the external power source fail.

Embodiments of the network node 600 may include additional components beyond those shown in FIG. 6 for providing certain aspects of the network node's functionality, including any of the functionality described herein and/or any functionality necessary to support the subject matter described herein. For example, the network node 600 may include user interface equipment to allow input of information into the network node 600 and to allow output of information from the network node 600. This may allow a user to perform diagnostic, maintenance, repair, and other administrative functions for the network node 600.

Figure 7:
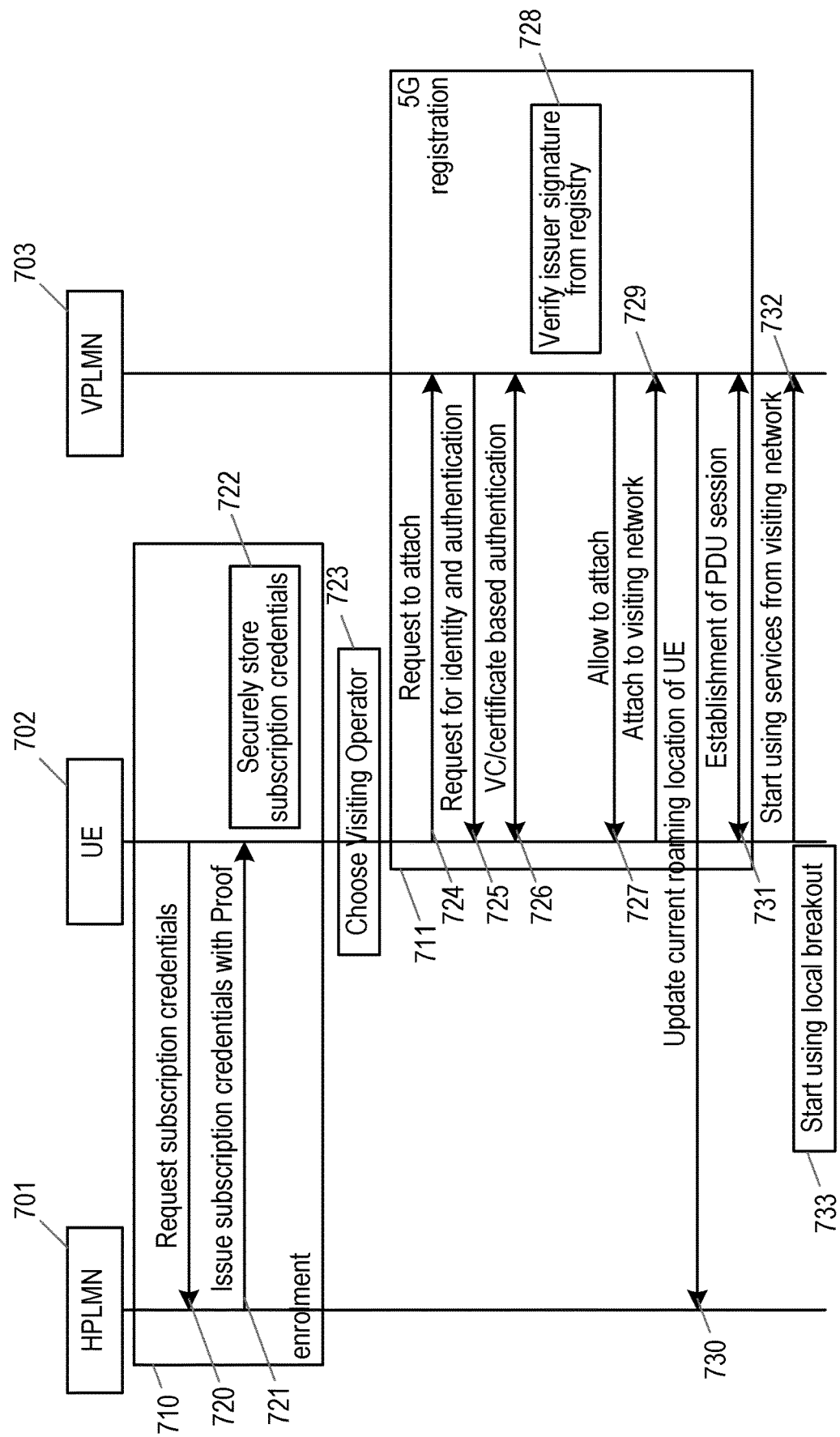
FIG. 7 is a signalling diagram/flow chart illustrating enrolment of a UE and registration of the UE with a VPLMN according to some embodiments.

The flow chart/signalling diagram in FIG. 7 illustrates an exemplary embodiment of the techniques described herein. FIG. 7 shows the signalling/operations between a first network 701, a wireless device (UE 702) that is a subscriber of the first network 701, and a second network 703. The first network 701 is the home network of the UE 702, and so the first network 701 is referred to as the home network 701 or HPLMN 701. According to FIG. 7, the UE 702 will roam away from the home network 701 and attach/connect to the second network 703. In that case, the second network 703 is a visited network 703 or VPLMN 703 for the UE 702. In the exemplary embodiment shown in FIG. 7, the UE 702 registers with the VPLMN 703 without the involvement of the HPLMN 701, and on registration of the UE 702, the VPLMN 703 informs the HPLMN 701.

It will be appreciated that the signalling/operations shown in FIG. 7 can be performed by different network nodes within the HPLMN 701 and VPLMN 703 as appropriate for the particular signalling/operation. For example, some signalling/operations can be performed by an access network node 410, whereas other signalling/operations can be performed by one or more type of core network node 408.

The exemplary embodiment in FIG. 7 relates to 5G networks (i.e. the HPLMN 701 and the VPLMN 703 are operating according to the 5G/NR standards), but it will be appreciated that the techniques described herein can be applied to networks operating according to different standards (e.g. 4G/LTE). In some cases, the HPLMN 701 and the VPLMN 703 may be operating according to different standards, or different versions or releases of the same standard.

The techniques shown in FIG. 7 comprise two main parts, an enrolment process 710 performed between the HPLMN 701 and the UE 702, and a registration process 711 performed between the UE 702 and the VPLMN 703 to enable the UE 702 to roam in the VPLMN 703 and to enable the VPLMN 703 to use local breakout for the UE's data traffic.

In FIG. 7 the registration process 711 is performed using VC/certificates, and local breakout can be performed using the same. However, it will be appreciated that the registration process 711 does not have to be performed using VC/certificates for the data usage recording solution presented herein to work, and a conventional registration process with the VPLMN 703 and HPLMN 701 can be used instead. The use of the conventional registration process with the VPLMN 703 and HPLMN 701 can enable backward compatibility with the existing (e.g. 5G) registration solutions.

The aim of the enrolment process 710 is for the UE 702 to be enrolled as a subscriber of the chosen HPLMN 701. Here, at step/signal 720, the UE 702 orders or requests subscription credentials from the HPLMN 701. The subscription credentials can be part of a subscription profile stored on or in a SIM or an embedded SIM (eSIM). The subscription credentials can be access credentials. The subscription profile stored on or in a SIM or eSIM can include other data or information relevant for 5G use.

For the techniques described herein, the UE 702 requires a private-public key pair which can be certificate-based or VC-based. That is, the UE 702 requires a public key that is known to (or accessible to) the HPLMN 701 and the VPLMN 703), and a private key that is known only by the UE 702. In some embodiments, a raw public key (RPK) could be used, in which case a lookup mechanism is required for mapping the RPK to an operator (the HPLMN 701 of the UE 702). This mapping could be performed either via a public key certificate, a VC, or a lookup table that maps a (RPK) public key to an operator.

At step/signal 721, the HPLMN 701 issues the subscription credentials to the UE 702. The subscription credentials are used to access 5G networks, and could be the private-public key pair described above, or the subscription credentials could be a conventional International Mobile Subscriber Identity (IMSI) and a shared secret. The subscription credentials can be part of a subscription profile that is provided to the UE 702 either via eSIM provisioning, or as a separate SIM card that can be inserted into the UE 702. As such, step 721 may be performed by the HPLMN 701 transmitting the subscription credentials to the UE 702 (e.g. in the eSIM provisioning embodiment), or step 721 can comprise the owner or user of the UE 702 obtaining a SIM card.

At step 722 the UE 702 stores the subscription credentials. These subscription credentials are stored securely in the UE 702, for example in a SIM card or in an eSIM.

The UE 702 now has the subscription credentials which means that the UE 702 is enrolled to the HPLMN 701.

In embodiments that use verifiable credentials (VC), the HPLMN 701 can act as the issuer 301 and issues the VC to the UE 702 (which is the holder 302), although it will be appreciated that an alternative entity trusted by the HPLMN 701 can act as the issuer 301. The identity stored in the VC is, for example, the hash of the public key of the VC, and the VC can also contain policies/metadata related to the subscription. For example the policies or metadata may indicate whether or not LBO is allowed for this UE 702, data usage limits when using LBO, whether other services are allowed or not, policies related to the use of these other services, etc. The VC can be issued to the UE 702 as part of the enrolment process 710 or the VC can be provided as part of a separate process. In some embodiments, the VC could be part of the subscription profile in addition to traditional subscription credentials (that can be used in case the registration of the UE 702 with the VPLMN 703 is performed in a conventional way and the VC is provided to the VPLMN 703 via a secondary authentication process) or the VC could itself be used as the subscription credentials.

At step 723, the UE 702 selects another network that it is to attach to while the UE 702 does not have coverage from the HPLMN 701. The selection of the VPLMN 703 in step 723 can be performed in a conventional manner.

Once the VPLMN 703 is selected, the registration process 711 is performed. The registration process 711 includes a primary authentication procedure in which the UE 702 authenticates itself to the VPLMN 703. As noted above, the registration process 711 could be performed according to the conventional 5G registration procedure. Alternatively, the registration process 711 can be performed as shown in FIG. 7. In this alternative approach, the 5G registration is performed locally with the VPLMN 703, with minimal interaction with the HPLMN 701.

Firstly, the UE 702 sends a request 724 to register with/attach to the VPLMN 703. The VPLMN 703 responds with a request 725 to the UE 702 to initiate identification and authentication of the UE 702 towards the VPLMN 703.

In step 726, authentication is performed. In step 726 an EAP-based authentication can be performed with the VPLMN 703. It will be appreciated that step/signal 726 can represent an exchange of several signals/messages between the UE 702 and the VPLMN 703. The EAP exchange is performed using the public key associated with the subscription profile received in step 721, i.e. the EAP exchange is performed using the public key of the VC, certificate or RPK. In the EAP-based authentication, the VPLMN 703 acts as an EAP server, i.e. the HPLMN 701 is not part of the EAP authentication as it would be in a conventional 5G registration with EAP.

There are three options for the EAP-based authentication.

In a first option the UE 702 has a public key certificate issued by the HPLMN 701 in the enrolment process 710. The public key certificate identifies the issuer of the certificate, for example the HPLMN 701 has signed the certificate, and the VPLMN 703 can use this to identify the roaming partner (i.e. the HPLMN 701). Thus, the VPLMN 703 verifies the certificate has been issued by one of its roaming partners, i.e. by the HPLMN 701. If the certificate is verified, the VPLMN 703 authenticates the UE 702 based on the certificate. This verification is shown as step 728.

In a second option the UE 702 has a VC issued by the HPLMN 701. The VPLMN 703 verifies that the VC was issued by a roaming partner (i.e. the HPLMN 701) by matching the issuer signature associated with the VC with the issuer's public key stored in the Verifiable Data Registry 304. The VPLMN 703 can then authenticate the UE 702 based on the public key of the UE/subscription. In addition, the VPLMN 703 can verify that the public key of the UE 702 matches the public key or hash of the public key stored in the VC (noting that the VC can have the public key itself or a hash of the public key of the holder of the VC stored therein). This verification is shown as step 728.

In a third option, the UE 702 has a RPK. In this case the VPLMN 703 looks up a mapping from the public key of the UE 702 to the issuing operator (i.e. to check that the issuing operator is the HPLMN 701) from a lookup service. The VPLMN 703 then authenticates the UE 702 based on the RPK.

For the second option that uses VCs, or if certificates are stored in a similar type of registry, and the VPLMN 703 doesn't already have the public key or certificate of the HPLMN 701 stored locally, in step 728 the VPLMN 703 can query the registry for the Issuer/certificate issuer public key based on the issuer's identity (ID), or certificate issuer ID in case certificates are used. Once the VPLMN 703 has the issuer's public key, it is able to verify the issuer's signature and thereby the validity of the VC or certificate as belonging to a valid subscriber of the HPLMN 701.

Assuming the authentication in step 726 is successful, and after any further 5G registration steps, the VPLMN 703 allows the UE 702 to attach to the VPLMN 703. This is shown by signal 727 from the VPLMN 703 to the UE 702. Signal 729 represents the UE 702 attaching to the VPLMN 703.

The VPLMN 703 also optionally sends a signal 730 to the HPLMN 701 to inform the HPLMN 701 that the subscriber has attached to the VPLMN 703. The HPLMN 701 will therefore know that the UE 702 is roaming in the VPLMN 703, and this enables the HPLMN 701 to route incoming calls or data for the subscription to the VPLMN 703.

It should be noted that a reason that the HPLMN 701 does not need to be involved in the registration process 711, other than receiving location update 730 from the VPLMN 703, is that according to the techniques described herein, all data usage by the UE/subscription is recorded and reported in a verifiable way, and thus the HPLMN 701 can trust any usage statistics or information presented to it by the VPLMN 703. Optionally, the VPLMN 703 may provide some subset of information exchanged in the authentication procedure to the HPLMN 701 to verify that the UE 702 has authenticated with the VPLMN 703.

Once the UE 702 has authenticated with the VPLMN 703, a PDU session for the UE 702 can be established (signals 731). The PDU session can be established in the conventional manner. The establishment of the PDU session enables the UE 702 to start using services in the VPLMN 703, as shown by signal 732. In some cases, the UE 702 can start using local breakout 733 for its data sessions if the VPLMN 703 permits this.

In the registration process 711 shown in FIG. 7, as the HPLMN 701 is not involved in the registration, the authentication is not forwarded to an AUSF in the HPLMN 701, as the VPLMN 703 would do in a conventional 5G registration procedure. Instead, the VPLMN 703 uses one of its own network functions (NFs) as an EAP server, i.e. an authentication server. For example, the AUSF in the VPLMN 703 could be used as the EAP server. When the VPLMN 703 receives the initial EAP message carrying the identity of the UE/subscription (i.e. received in response to the request 725), the initial EAP message may be based on identity type (e.g. a certificate or VC) for which the VPLMN 703 is configured to handle the authentication on its own. Alternatively, the UE 702 could set a flag or indicator, either in the initial EAP message or in the request 724 to attach to the VPLMN 703, whether the UE 702 wants to use LBO or other services where the UE 702 is to verify data usage, or use a session where the VPLMN 703 handles the data traffic in a conventional way. Alternatively, the use of LBO or similar could be set as a default behaviour for roaming UEs, and instead of the VPLMN 703 forwarding the authentication to the AUSF in the HPLMN 701, the VPLMN 703 forwards the message to the local EAP server (e.g. local AUSF) instead.

Based on the identity type (e.g. certificate or VC), flag or indicator, or default behaviour, the VPLMN 703 will be able to determine whether to involve the HPLMN 701 in the registration process or not. Thus, the VPLMN 703 can determine whether to perform a conventional registration process or the registration process shown in FIG. 7.

In the registration process 711, since public key-based identities are being used, the EAP server does not need to know any secret value of the subscription, it just needs to verify that the subscription (i.e. certificate or VC) has been issued by a roaming partner of the VPLMN 703 (and specifically by the HPLMN 701 of the UE 702). The VPLMN 703 does this using the Registry 304 from where it can fetch or retrieve the public key of the issuer to verify the received public key of the subscription, as well as verify the identity of the issuer/HPLMN 701.

Thus, in the registration process 711 of FIG. 7 that uses VCs described above, the VPLMN 703 can learn the VC during the 5G registration process as the VC is used as a subscription credential during registration. However, if conventional 5G registration is used instead, then the VPLMN 703 needs to obtain the VC, and any contained policy/ies, in some other way. In one approach, the HPLMN 701 could provide the VC and policy to the VPLMN 703 as part of the conventional 5G registration, although this would require some additional signalling from the HPLMN 701 to the VPLMN 703 during the 5G registration process. For example, following successful registration, the HPLMN 701 can provide the public key of the UE 702 (e.g. the public key certificate from the private-public key pair, the VC, the RPK, etc.) to the VPLMN 703.

As an alternative to the VPLMN 703 learning the public key of the VC or certificate during the registration process, the UE 702 could provide the public key of the VC or certificate to the VPLMN 703 in signalling that is separate from the 5G registration process. In particular, when a UE 702 that wants to use LBO registers with the VPLMN 703 using the conventional 5G registration process, the UE 702 could request usage of a specific DNN, e.g. "internet_LBO", which is used for LBO access at the VPLMN 703. This DNN would be configured to require secondary authentication (SA) by the UE 702, so the VPLMN 703 would challenge the UE 702 to perform secondary authentication using EAP. The UE 702 would here use the VC or certificate as the credential in the EAP-based SA. The VPLMN 703 can, as discussed above, authenticate the UE 702 based on the VC or certificate. Within the VPLMN 703, the SMF could act as the EAP authenticator, and, for example, the AUSF in the VPLMN 703 can act as an AAA/EAP server.

In some embodiments, the certificate or VC can comprise one or more policies, for example including a roaming service usage policy for the subscription. The VPLMN 703 can therefore learn the policy/ies in the registration process 711 when the VC or certificate is used in the VC/certificate-based authentication 726. Thus, the policy/ies can be learnt in the primary authentication of the UE 702 with the VPLMN 703.

Alternatively, if conventional registration is used to register the UE 702 with the VPLMN 703, the VPLMN 703 can receive the policy/ies in a secondary authentication process that uses the certificate or VC, for example when authenticating with a DNN such as "internet_LBO" using the VC or certificate. In embodiments where a VC or certificate is not used, or the VC or certificate does not include the policy/ies, the policy/ies can be provided by the HPLMN 701 to the VPLMN 703 following the conventional registration process. For example, following successful registration, the HPLMN 701 can provide the public key of the UE 702 to the VPLMN 703, along with a policy/ies signed by the HPLMN 701. The signed policy/ies are ideally bound to the specific subscription/UE 702 by, for example, including the public key of the subscriber/UE 702 in the policy, but the policy could be HPLMN-specific (and can even be shared with the VPLMN 703 beforehand), in which case the public key of the subscriber/UE 702 still needs to be provided, but it can be provided separately from the policy. In another example, as an alternative to signed policies, the HPLMN 701 can indicate one of a set of pre-arranged policies to the VPLMN 703. The HPLMN 701 and the VPLMN 703 may, for example, have agreed specific identifiers for a set of pre-arranged policies. In this case, the full policy does not have to be provided following the conventional registration procedure, and instead a policy identifier can be provided. It will be appreciated that the policy identifier can be used in place of the full policy in the VC-based and certificate-based registration processes too.

In another alternative, the HPLMN 701 can exchange static policy/ies with respect to data and/or service (for example use of LBO) with the VPLMN 703 as part of agreeing a roaming agreement.

However the policies are received, the VPLMN 703 can store these policy/ies for charging purposes later on. Where a NF in the VPLMN 703 operates as an EAP server (e.g. the AUSF) and receives the policy/ies as part of an authentication process, the EAP server could store this policy information itself, or forward the policy/ies or information extracted from the policy to some other NF in the VPLMN 703.

Thus, based on the above, local breakout can be used by default in roaming scenarios. If a VC is used as part of the registration process 711 or as part of a secondary authentication procedure, the VC can include, for example, the HPLMN's policy containing information on whether and how LBO is allowed to be used by the subscriber (the holder of the VC, i.e. the UE 702). The VPLMN 703 could, when presented with the VC, inspect the VC to find out if the UE 702 is allowed to perform a 5G registration process directly with the VPLMN 703 or if the HPLMN 701 needs to be involved. Further, other policies, such as details of LBO use as well as policies regarding use of other services, can also be present in the VC, and the VPLMN 703 can use this information to set up the correct type of session for the subscription/UE 702.

As noted above, a significant issue currently with the use of LBO is the lack of trust in the recording of data usage. As described further below, this issue is addressed through the use of the VC credentials and/or public key of the subscription.

Figure 8:
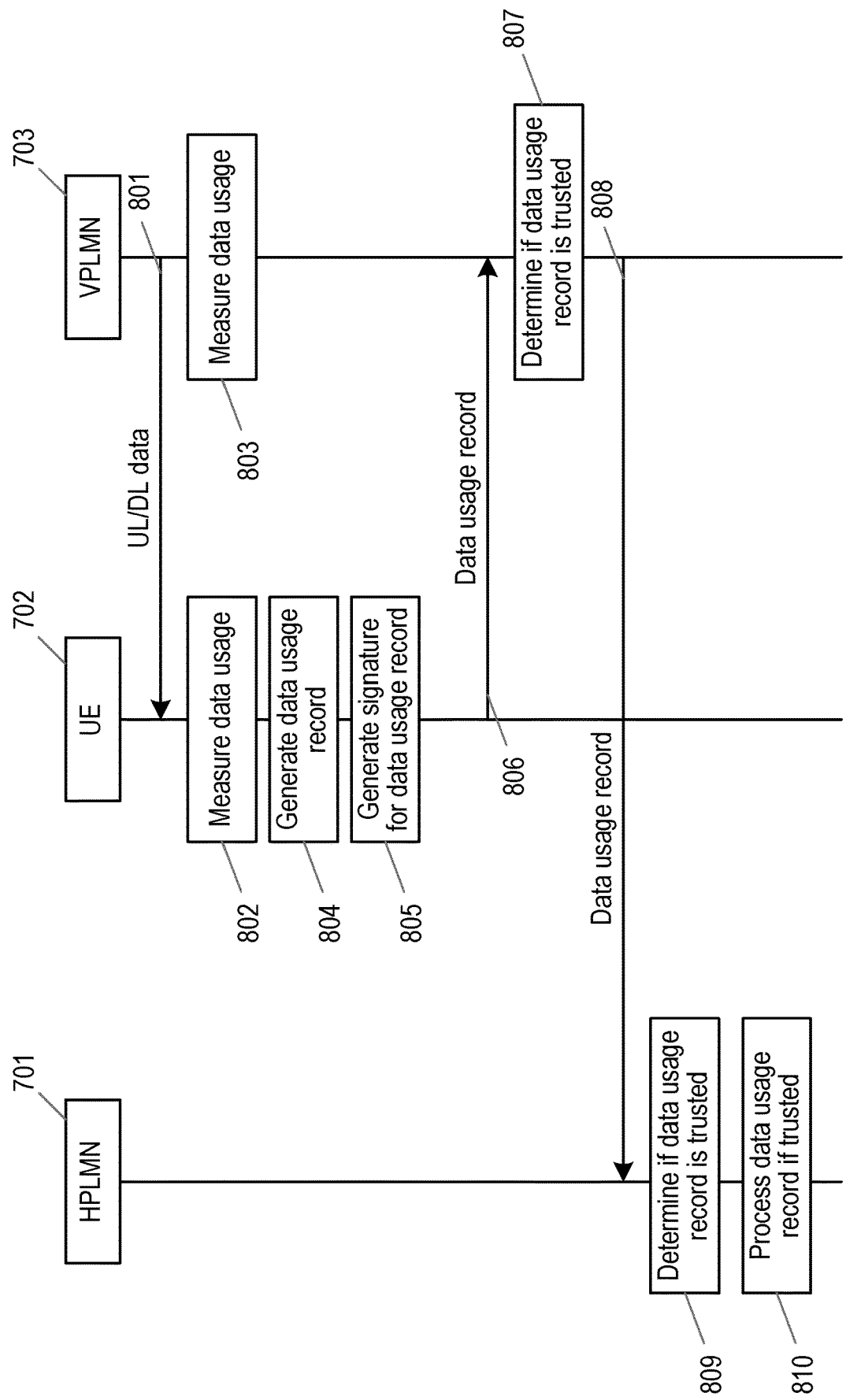
FIG. 8 is a signalling diagram/flow chart illustrating the generation and use of data usage records according to various embodiments.

The flow chart/signalling diagram in FIG. 8 illustrates how a roaming UE 702 can produce an undeniable proof of data usage according to some embodiments. Briefly, to obtain an undeniable proof of data usage, the UE 702 needs to generate a data usage record indicating its actual data use in LBO or other service while roaming, and include a signature for the data usage record.

FIG. 8 shows the HPLMN 701, UE 702 and VPLMN 703 following registration and authentication of the UE 702 with the VPLMN 703. Thus, the VPLMN 703 is providing a service to the UE 702, e.g. LBO, and data is being transmitted and/or received by the UE 702 in the session, as indicated by UL/DL data 801.

The UE 702 measures its data usage during the session (step 802), and the VPLMN 703 also measures the UE's data usage during the session (step 803). Steps 802 and 803 can comprise measuring the total amount of data transmitted and received during the session, the amount of data transmitted in the session, or the amount of data received in the session.

The UE 702 then generates a data usage record (step 804) relating to the session with the VPLMN 703. The data usage record indicates the amount of data measured in step 802. The amount of data used can be indicated as a single number, or as separate numbers for uplink (UL) and/or downlink (DL) data. For a service other than an LBO service, a different usage metric may be more relevant and recorded instead.

The data usage record generated by the UE 702 in step 804 can also include any one or more of the following parameters:

A service identifier that identifies the type of service used by the UE 702, e.g. LBO, and thus the type of service the data usage record relates to. The service identifier may be omitted if data usage records are only used for one type of service, e.g. LBO.

A session identifier that identifies the session between the UE 702 and the VPLMN 703. The session identifier is useful to prevent the VPLMN 703 from sending multiple reports of data use for the same session in an attempt to get the UE 702 charged multiple times for the same data (or rather the session identifier is useful for the HPLMN 701 to identify when it has already received a data usage record for a particular session). The sending of multiple data usage records for a single session could be possible as the UE 702 might be configured to generate multiple data usage reports for one session, e.g. one report every 5 minutes. The inclusion of a session identifier is therefore useful for the HPLMN 701.

The policy or a hash of the policy from the 5G registration/authentication procedure can be included to link the data usage record to the policy provided to the VPLMN 703 during registration 711. The inclusion of the policy or hash of the policy binds the data usage to the policy, i.e. the data was used according to the policy. It is the responsibility of the VPLMN 703 to follow the policies provided in a certificate or VC, for example a data usage limit indicated in the certificate or VC. The VPLMN 703 has to bear the cost of anything provided to the UE 702 that was outside the scope of the policy. On the other hand, policies protect the VPLMN 703 as the policy allows the VPLMN 703 to provide a service according to the policy and to be paid for it. The policy or hash of the policy does not need to be included if a static roaming agreement between the HPLMN 701 and the VPLMN 703 already states a LBO or other service policy for all subscribers of the HPLMN 701. The hash of the policy could be a hash of the certificate containing the policies (that has been verified by the VPLMN 703), or a hash of the VC containing the policies (that has been verified by the VPLMN 703). In some embodiments if a data usage record is generated periodically for a particular session, it can be sufficient if only the first data usage record contains the policy or hash of the policy.

In embodiments where a conventional registration process is used to register the UE 702 with the VPLMN 703, the UE 702 may not be aware of the relevant policy, since the policy was provided to the VPLMN 703 by the HPLMN 701. In this case, the UE 702 should have the public key issued by the HPLMN 701, which is the same as sent in the policy sent by the HPLMN 701 to the VPLMN 703. In this way the VPLMN 703 can verify the data usage record and verify that the data usage record comes from the UE 702 that the policy is for.

A timestamp that indicates the time associated with the data usage measurement in the data usage record. The timestamp is useful for preventing the VPLMN 703 from waiting a long time and resending an old data usage record to the HPLMN 703 for charging a second time. As an alternative to a timestamp, a sequence number can be included that identifies the first session and/or the data usage measurement. The sequence number can be incremented in each data usage record.

An identifier for the VPLMN 703 providing the service. The VPLMN identifier is useful to prevent VPLMNs from sharing data usage records and charging the UE 702 multiple times for the same data usage. The VPLMN identifier is also useful to enable the HPLMN 701 to check that the data usage record relates to the VPLMN 703 that sent it the data usage record.

In some embodiments, the identifier of the VPLMN 703 and the session identifier can be found from a common parameter if the session identifier also identifies where the session is established (i.e. in which VPLMN).

The UE 702 may be configured to generate a data usage record at regular time intervals, for example every 5 minutes. Alternatively (although not shown in FIG. 8), the VPLMN 703 could request a data usage report from the UE 702. The VPLMN 703 may request a data usage record to check that the UE 702 and the VPLMN 703 agree on the amount of data used. For example, if the UE 702 has consumed, and/or is continuing to consume, a large amount of data, the VPLMN 703 may request a data usage record from the UE 702. Alternatively or in addition, the VPLMN 703 could request an up-to-date data usage record from the UE 702 when the UE moves within its network, e.g. from one base station to another, when the UE 702 appears to be leaving the VPLMN 703 (e.g. roaming to another region or returning to the HPLMN 701), or when the UE 702 is deregistering from the VPLMN 703.

In step 805 the UE 702 generates a signature for the data usage record and includes the signature in the data usage record. The signature of the data usage record is generated by the private key of the UE 702, i.e. the private key of the VC, the private key of the public-private (asymmetric) key pair, the private key of the RPK key pair, or the private key of the public key certificate key pair, as appropriate.

At step 806 the UE 702 sends the data usage record to the VPLMN 703.

In step 807 the VPLMN 703 examines the received data usage record to determine if the data usage record can be trusted. For example, the VPLMN 703 can compare the amount of data measured in step 803 to the amount of data indicated in the data usage record to determine if the amounts match, or are within an acceptable amount of each other. If the VPLMN 703 disagrees with the amount of data indicated in the signed data usage record, the VPLMN 703 may deny the UE 702 further service.

As part of determining whether the data usage record can be trusted in step 807, the VPLMN 703 also determines if the signature of the data usage record is valid, i.e. that the data usage record was signed by the subscriber/UE 702. In particular, the VPLMN 703 can determine if the signature is valid using a public key associated with the private key used by the UE 702 to generate the signature.

If the data usage record includes parameters in addition to the recorded data usage, in step 807 the VPLMN 703 can also check or verify those other parameters against its own information. For example, the VPLMN 703 can verify that:

The service identifier in the data usage record is correct.
The session identifier in the data usage record matches the session identifier of the UE 702.
The timestamp or sequence number is correct.
The policy/ies or hash of the policy/ies (i.e. the policies provided by UE 702 during 5G registration 711) is included in the data usage record, and in some embodiments, if the policy/ies or hash of the policy/ies is correct. In particular, if the VPLMN 703 is periodically receiving a data usage record, it can be sufficient for the VPLMN 703 to verify that the previous data usage record and the new data usage record contain the same hash. Alternatively, in the case of periodically received data usage records, it can be sufficient if only the first data usage record for the session includes the policy or hash of the policy. For first data usage record received for a session, the VPLMN 703 can itself generate a hash of the policy/ies, and verify that this hash value matches that included in the received data usage record.
The VPLMN identifier in the data usage record is the identifier of the VPLMN 703.

If any of these checks fail, the VPLMN 703 can stop serving the UE 702 as it is behaving maliciously or functioning incorrectly. If these checks are passed, the VPLMN 703 can discard any previously received data usage record relating to the same session (that has not been sent to the HPLMN 701) and keep the data usage record as the most recent one that contains all of the relevant information.

Any data usage record received from the UE 702 that the VPLMN 703 trusts can be sent by the VPLMN 703 to the HPLMN 701 as proof of data usage by a specific subscription/UE, with the intention that the data usage record is used as a basis for charging the subscriber/UE 702. Signal 808 shows the sending of the data usage record. The sending 808 of the data usage record to the HPLMN 701 is similar to how a VPLMN conventionally provides service usage statistics to the HPLMN for a roaming UE. However, the format and signature on the data usage record provides proof of the data usage by the subscription/UE to the HPLMN 701.

As noted above, including a session identifier and including a timestamp or sequence number can help prevent the reuse of the same data usage record by the VPLMN 703. For example, a data usage record could have a certain lifetime after generation by the UE 702, after which they cannot be redeemed by the VPLMN 703 with the HPLMN 701.

Thus, after receiving the data usage record from the VPLMN 703, the HPLMN 701 can determine if the data usage record is to be trusted (step 809). This can be performed in a similar way to step 807 in the VPLMN 703, although in this case the HPLMN 701 does not verify the amount of data usage.

Thus, in step 809 the HPLMN 701 can verify or determine any of:

Which VPLMN 703 the data has been used in based on the VPLMN identifier.
What service has been used (e.g. LBO) based on the service identifier.
The specific session the data usage record relates to based on the session identifier (this can enable the HPLMN 701 to check that this session has not already been charged for).
When the session occurred based on the timestamp or sequence number (this can enable the HPLMN 701 to check that this is not an old session that is being re-used by the VPLMN 703 after the HPLMN 701 has purged or discarded old records).
The amount of data usage.
Under which policy the services have been used.
The UE 702 has correctly signed the data usage record, i.e. the signature is correct, indicating that the UE 702 agrees to the content of the data usage record.

If the HPLMN 701 is not satisfied with any element of information in the data usage record, the HPLMN 701 can reject or discard the data usage record, or dispute the data usage record with the VPLMN 703. In that case (not shown in FIG. 8) the VPLMN 703 can send the certificate/VC containing the policies (which hashes to the hash in the data usage record) to the HPLMN 701. The certificate/VC was issued by the HPLMN 701 and is signed by the HPLMN 701, so the HPLMN 701 cannot deny that the policy is valid. Furthermore, the UE 702 included the hash of the certificate/VC in the data usage record, so it binds the UE 702 to it having agreed to those policies for the session.

Assuming that the HPLMN 701 determines that the data usage record is valid and/or trusted, the HPLMN 701 can process the data usage record (step 810). This processing can comprise applying charges associated with the indicated data usage to the account of the subscriber, and/or compensating the VPLMN 703 for providing the service to the roaming UE 702.

Figure 9:
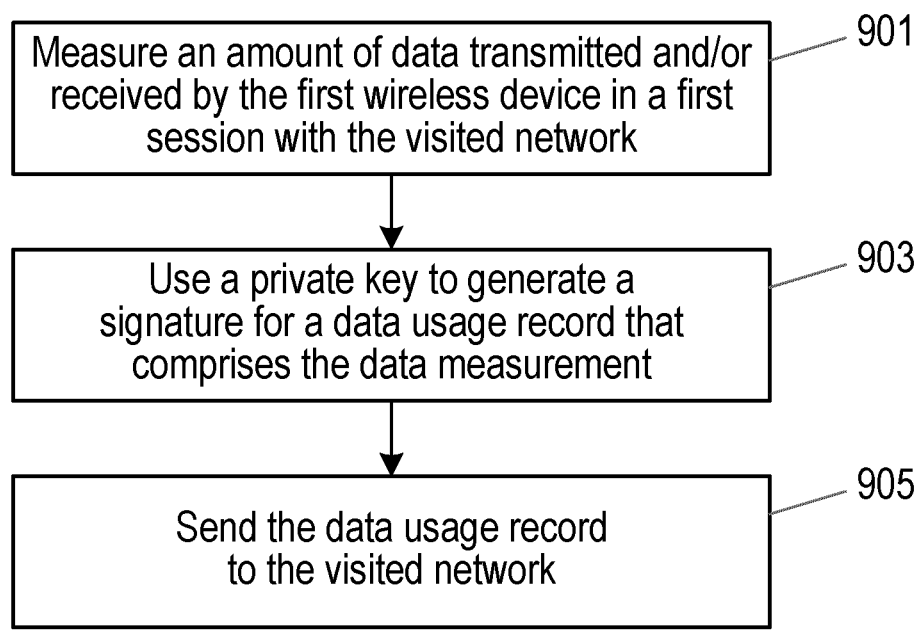
FIG. 9 is a flow chart illustrating a method performed by a first wireless device according to various embodiments.

FIG. 9 is a flow chart illustrating a method according to various embodiments performed by a first wireless device/UE that is roaming in a visited network. The first wireless device may perform the method in response to executing suitably formulated computer readable code. The computer readable code may be embodied or stored on a computer readable medium, such as a memory chip, optical disc, or other storage medium. The computer readable medium may be part of a computer program product.

In step 901, the first wireless device measures an amount of data transmitted and/or received by the first wireless device in a first session with the visited network.

In step 903, the first wireless device use a private key to generate a signature for a data usage record that comprises the data measurement. A public key corresponding to the private key is associated, by a home network of the first wireless device, with the first wireless device. The private key can be any of a private key of an asymmetric key pair; a private key of a RPK key pair; a private key of a public key certificate key pair; a private key associated with a public key of a VC, or a public key referred to in a VC.

In some embodiments, the data usage record can comprise any one or more of: a service identifier that identifies a type of service used by the first wireless device in the first session; a session identifier for the first session; a roaming policy or a hash of a roaming policy, (where the roaming policy relates to the operation of the first wireless device in a visited network); a timestamp that identifies a timing of the first session and/or a timing of the data measurement; a sequence number that identifies the first session and/or the data measurement; and a visited network identifier that identifies the visited network.

In step 905, the first wireless device sends the data usage record to the visited network.

In some embodiments, the method further comprises the first wireless device providing a public key related to the private key to the visited network. The public key can be provided to the visited network in a primary authentication procedure or in a secondary authentication procedure. Either of these authentication procedures can be performed prior to, or at, the start of the first session.

In some embodiments, the first wireless device forms the data usage record periodically, and/or after a predetermined amount of data is transmitted and/or received by the first wireless device. In alternative embodiments, the first wireless device can form the data usage record in response to a request from the visited network for a data usage record.

Figure 10:
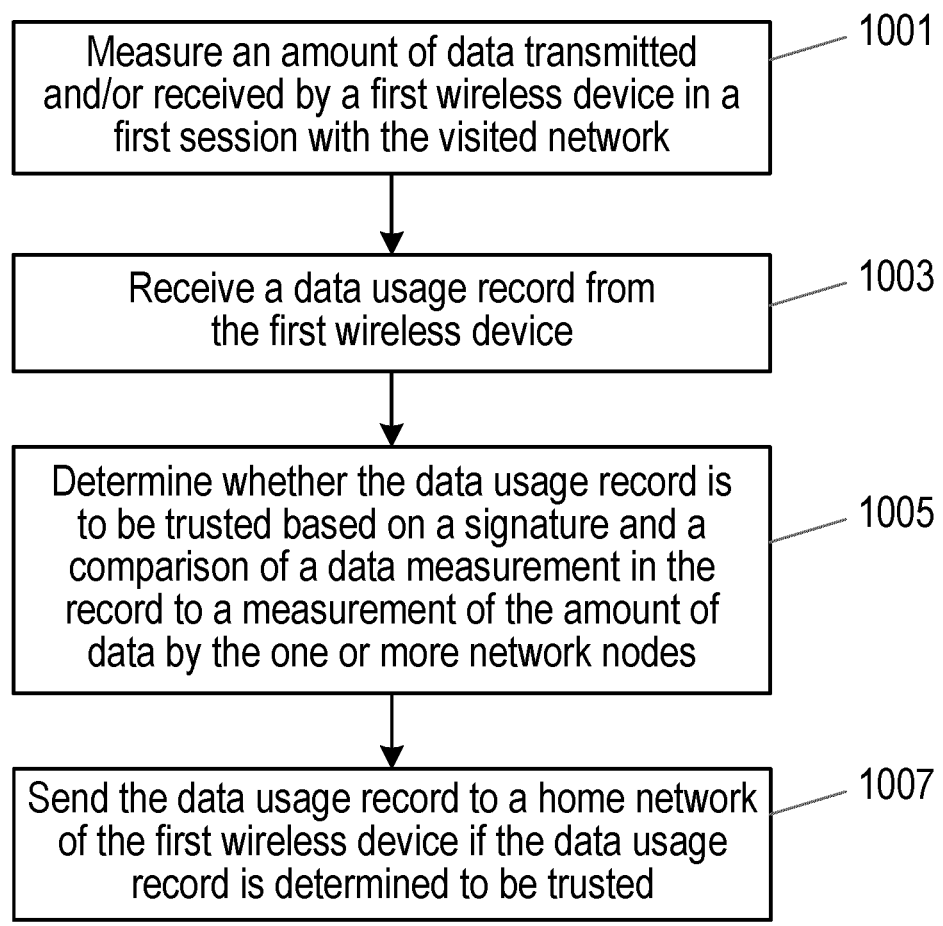
FIG. 10 is a flow chart illustrating a method performed by one or more network nodes in a visited network.

FIG. 10 is a flow chart illustrating a method according to various embodiments performed by one or more network nodes in a visited network. The one or more network nodes may perform the method in response to executing suitably formulated computer readable code. The computer readable code may be embodied or stored on a computer readable medium, such as a memory chip, optical disc, or other storage medium. The computer readable medium may be part of a computer program product.

In step 1001, the one or more network nodes measure an amount of data transmitted and/or received by a first wireless device in a first session with the visited network. The first wireless device is roaming in the visited network.

In step 1003, the one or more network nodes receive a data usage record from the first wireless device. The data usage record comprises a signature for the data usage record and a data measurement by the first wireless device of the amount of data transmitted and/or received by the first wireless device in the first session.

In some embodiments, the data usage record can further comprise any one or more of: a service identifier that identifies a type of service used by the first wireless device in the first session; a session identifier for the first session; a roaming policy or a hash of a roaming policy (where the roaming policy relates to the operation of the first wireless device in the visited network); a timestamp that identifies a timing of the first session and/or a timing of the data measurement by the first wireless device; a sequence number that identifies the first session and/or the data measurement; and a visited network identifier that identifies the visited network.

In step 1005, the one or more network nodes determine whether the data usage record is to be trusted based on the signature and a comparison of the data measurement to the measurement of the amount of data by the one or more network nodes. Step 1005 uses a public key associated with a private key that is to be used by the first wireless device to generate signatures for data usage records.

In some embodiments, step 1005 comprises determining if the signature is valid, and/or determining if the data measurement matches or is within a predetermined amount of the measurement of the amount of data by the one or more network nodes.

In embodiments where the data usage record further comprises any of the service identifier, the session identifier, the roaming policy or hash of the roaming policy, the timestamp, the sequence number, and the visited network identifier step 1005 can comprise verifying the one or more of the service identifier, the session identifier, the roaming policy or hash of the roaming policy, the timestamp, the sequence number and the visited network identifier.

In step 1007, the one or more network nodes send the data usage record to a home network of the first wireless device if the data usage record is determined to be trusted.

In some embodiments, if it is determined that the data usage record is not trusted, the one or more network nodes can stop the provision of a service to the first wireless device.

In some embodiments, the one or more network nodes can receive the public key from the first wireless device or the home network. The public key can be received in a primary authentication procedure or in a secondary authentication procedure.

In some embodiments, the one or more network nodes can receive a roaming policy from the first wireless device or the home network. The roaming policy can be received in or after a primary authentication procedure or in a secondary authentication procedure. The roaming policy relates to the operation of the first wireless device in the visited network.

In some embodiments, the one or more network nodes can send a first request to the first wireless device, where the first request requests the first wireless device to send a data usage record to the visited network.

Figure 11:
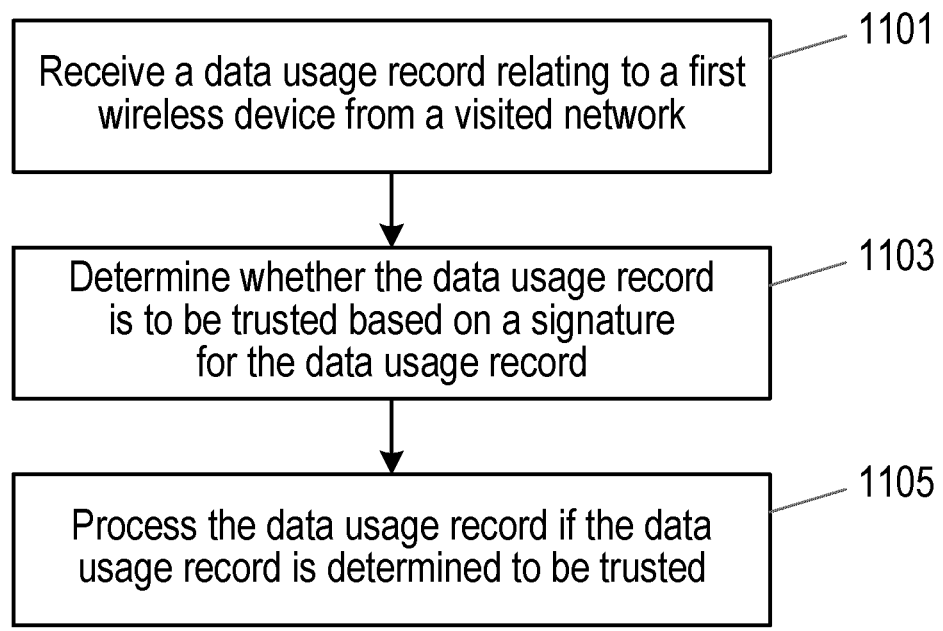
FIG. 11 is a flow chart illustrating a method performed by one or more network nodes in a home network.

FIG. 11 is a flow chart illustrating a method according to various embodiments performed by one or more network nodes in a home network. The one or more network nodes may perform the method in response to executing suitably formulated computer readable code. The computer readable code may be embodied or stored on a computer readable medium, such as a memory chip, optical disc, or other storage medium. The computer readable medium may be part of a computer program product.

In step 1101, the one or more network nodes in the home network receive a data usage record relating to a first wireless device from a visited network. The first wireless device is a subscriber of the home network and is roaming in the visited network. The data usage record comprises a signature for the data usage record and a data measurement by the first wireless device of the amount of data transmitted and/or received by the first wireless device in a first session with the visited network.

In some embodiments, the data usage record further comprises any one or more of a service identifier that identifies a type of service used by the first wireless device in the first session; a session identifier for the first session; a roaming policy or a hash of a roaming policy (where the roaming policy relates to the operation of the first wireless device in a visited network); a timestamp that identifies a timing of the first session and/or a timing of the data measurement; a sequence number that identifies the first session and/or the data measurement; and a visited network identifier that identifies the visited network.

In step 1103, the one or more network nodes in the home network determine whether the data usage record is to be trusted based on the signature. Step 1103 uses a public key associated with a private key that is to be used by the first wireless device to generate signatures for data usage records.

In some embodiments, the public key and private key are any of: an asymmetric key pair; a RPK key pair; a public key certificate key pair; and a public-private key pair associated with a VC.

In step 1105, the one or more network nodes process the data usage record if the data usage record is determined to be trusted.

In some embodiments, if it is determined that the data usage record is not trusted, the one or more network nodes can reject the received data usage record.

In some embodiments, the one or more network nodes in the home network can provide the public key to the visited network in a primary authentication procedure for the first wireless device.

In some embodiments, the one or more network nodes in the home network can provision the private key to the first wireless device.

In some embodiments, the one or more network nodes can send a roaming policy relating to the first wireless device to the visited network in or after a primary authentication procedure for the first wireless device. The roaming policy relates to the operation of the first wireless device in the visited network.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method performed by a first wireless device that is roaming in a visited network, the method comprising:
   measuring an amount of data transmitted and/or received by the first wireless device in a first session with the visited network;
   using a private key to generate a signature for a data usage record that comprises the data measurement, wherein a public key corresponding to the private key is associated, by a home network of the first wireless device, with the first wireless device; and
   sending the data usage record to the visited network, wherein
   the data usage record further comprises:
      a service identifier that identifies a type of service used by the first wireless device in the first session;
      a session identifier for the first session;
      a roaming policy or a hash of a roaming policy, wherein the roaming policy relates to the operation of the first wireless device in a visited network;
      a timestamp that identifies a timing of the first session and/or a timing of the data measurement;
      a sequence number that identifies the first session and/or the data measurement; and/or
      a visited network identifier that identifies the visited network.

2. The method of claim 1, wherein the private key is any of: a private key of an asymmetric key pair; a private key of a raw public key, RPK, key pair; a private key of a public key certificate key pair; and a private key associated with a public key of a verifiable credential, VC, or a public key referred to in a VC.

3. The method of claim 1, wherein the method further comprises:
   providing a public key related to the private key to the visited network in a primary authentication procedure or in a secondary authentication procedure.

4. The method of claim 1, wherein the method comprises forming the data usage record periodically, and/or after a predetermined amount of data is transmitted and/or received by the first wireless device.

5. The method of claim 1, wherein the method comprises forming the data usage record in response to a request from the visited network for a data usage record.

6. A method performed by a network node in a visited network, the method comprising:
   measuring an amount of data transmitted and/or received by a first wireless device in a first session with the visited network, wherein the first wireless device is roaming in the visited network;
   receiving a data usage record from the first wireless device, wherein the data usage record comprises a signature for the data usage record and a data measurement by the first wireless device of the amount of data transmitted and/or received by the first wireless device in the first session;
   determining whether the data usage record is to be trusted based on the signature and a comparison of the data measurement to the measurement of the amount of data by the one or more network nodes, wherein the determining comprises using a public key associated with a private key that is to be used by the first wireless device to generate signatures for data usage records; and
   sending the data usage record to a home network of the first wireless device if the data usage record is determined to be trusted, wherein
   the data usage record further comprises:
      a service identifier that identifies a type of service used by the first wireless device in the first session;
      a session identifier for the first session;
      a roaming policy or a hash of a roaming policy, wherein the roaming policy relates to the operation of the first wireless device in a visited network;
      a timestamp that identifies a timing of the first session and/or a timing of the data measurement;
      a sequence number that identifies the first session and/or the data measurement; and/or
      a visited network identifier that identifies the visited network.

7. The method of claim 6, wherein the method further comprises:
   receiving the public key from the first wireless device or the home network in a primary authentication procedure or in a secondary authentication procedure.

8. The method of claim 6, wherein the method further comprises:
   receiving a roaming policy from the first wireless device or the home network in or after a primary authentication procedure or in a secondary authentication procedure, wherein the roaming policy relates to the operation of the first wireless device in the visited network.

9. The method of claim 6, wherein the step of determining whether the data usage record is to be trusted comprises:
   determining if the signature is valid.

10. The method of claim 6, wherein the step of determining whether the data usage record is to be trusted comprises:
    determining if the data measurement matches or is within a predetermined amount of the measurement of the amount of data by the one or more network nodes.

11. The method of claim 6, wherein the step of determining whether the data usage record is to be trusted comprises:

verifying the one or more of the service identifier, the session identifier, the roaming policy or hash of the roaming policy, the timestamp, the sequence number and the visited network identifier.

12. A method performed by a network node in a home network, the method comprising:
receiving a data usage record relating to a first wireless device from a visited network, wherein the first wireless device is a subscriber of the home network and is roaming in the visited network, and the data usage record comprises a signature for the data usage record and a data measurement by the first wireless device of the amount of data transmitted and/or received by the first wireless device in a first session with the visited network;
determining whether the data usage record is to be trusted based on the signature, wherein the determining comprises using a public key associated with a private key that is to be used by the first wireless device to generate signatures for data usage records; and
processing the data usage record if the data usage record is determined to be trusted, wherein
the data usage record further comprises:
a service identifier that identifies a type of service used by the first wireless device in the first session;
a session identifier for the first session;
a roaming policy or a hash of a roaming policy, wherein the roaming policy relates to the operation of the first wireless device in a visited network;
a timestamp that identifies a timing of the first session and/or a timing of the data measurement;
a sequence number that identifies the first session and/or the data measurement; and/or
a visited network identifier that identifies the visited network.

13. A first wireless device, the first wireless device comprising:
memory; and
processing circuitry operable to execute instructions stored in the memory, wherein the first wireless device is configured to:
measure an amount of data transmitted and/or received by the first wireless device in a first session with a visited network;
use a private key to generate a signature for a data usage record that comprises the data measurement, wherein a public key corresponding to the private key is associated, by a home network of the first wireless device, with the first wireless device; and
send the data usage record to the visited network, wherein the data usage record further comprises:
a service identifier that identifies a type of service used by the first wireless device in the first session;
a session identifier for the first session;
a roaming policy or a hash of a roaming policy, wherein the roaming policy relates to the operation of the first wireless device in a visited network;
a timestamp that identifies a timing of the first session and/or a timing of the data measurement;
a sequence number that identifies the first session and/or the data measurement; and/or
a visited network identifier that identifies the visited network.

14. A network node, the network node comprising:
memory; and
processing circuitry operable to execute instructions stored in the memory, wherein the network node is configured to:
measure an amount of data transmitted and/or received by a first wireless device in a first session with a visited network, wherein the first wireless device is roaming in the visited network;
receive a data usage record from the first wireless device, wherein the data usage record comprises a signature for the data usage record and a data measurement by the first wireless device of the amount of data transmitted and/or received by the first wireless device in the first session;
determine whether the data usage record is to be trusted based on the signature and a comparison of the data measurement to the measurement of the amount of data by the one or more network nodes, wherein the determining comprises using a public key associated with a private key that is to be used by the first wireless device to generate signatures for data usage records; and
send the data usage record to a home network of the first wireless device if the data usage record is determined to be trusted, wherein
the data usage record further comprises:
a service identifier that identifies a type of service used by the first wireless device in the first session;
a session identifier for the first session;
a roaming policy or a hash of a roaming policy, wherein the roaming policy relates to the operation of the first wireless device in a visited network;
a timestamp that identifies a timing of the first session and/or a timing of the data measurement;
a sequence number that identifies the first session and/or the data measurement; and/or
a visited network identifier that identifies the visited network.

15. The network node of claim 14, wherein the one or more network nodes are further configured to:
receive the public key from the first wireless device or the home network in a primary authentication procedure or in a secondary authentication procedure.

16. The network node of claim 14, wherein the one or more network nodes are further configured to:
receive a roaming policy from the first wireless device or the home network in or after a primary authentication procedure or in a secondary authentication procedure, wherein the roaming policy relates to the operation of the first wireless device in the visited network.

17. The network node of claim 14, wherein the one or more network nodes are configured to determine whether the data usage record is to be trusted by determining if the signature is valid.

18. The network node of claim 14, wherein the one or more network nodes are configured to determine whether the data usage record is to be trusted by determining if the data measurement matches or is within a predetermined amount of the measurement of the amount of data by the one or more network nodes.

* * * * *